(12) United States Patent
Kubo et al.

(10) Patent No.: US 12,348,896 B2
(45) Date of Patent: Jul. 1, 2025

(54) TRANSMISSION DEVICE, TRANSMISSION METHOD, AND RECEPTION DEVICE

(71) Applicant: SONY GROUP CORPORATION, Tokyo (JP)

(72) Inventors: Manabu Kubo, Tokyo (JP); Kunihiro Esaki, Tokyo (JP); Akiyo Fukuda, Tokyo (JP); Katsuaki Yokomizo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 243 days.

(21) Appl. No.: 17/906,168

(22) PCT Filed: Mar. 11, 2021

(86) PCT No.: PCT/JP2021/009717
§ 371 (c)(1),
(2) Date: Sep. 12, 2022

(87) PCT Pub. No.: WO2021/187292
PCT Pub. Date: Sep. 23, 2021

(65) Prior Publication Data
US 2023/0114790 A1   Apr. 13, 2023

(30) Foreign Application Priority Data
Mar. 18, 2020   (JP) .................................. 2020-048240

(51) Int. Cl.
*H04N 7/10* (2006.01)
*H04N 25/13* (2023.01)

(52) U.S. Cl.
CPC ............. *H04N 7/10* (2013.01); *H04N 25/135* (2023.01)

(58) Field of Classification Search
CPC .... H04N 7/10; H04N 25/135; H04N 21/4223; H04N 21/43635; H04N 23/60
See application file for complete search history.

(56) References Cited

U.S. PATENT DOCUMENTS 6,192,399 B1 * 2/2001 Goodman ........... H04L 12/2801
348/E7.051
7,088,398 B1 * 8/2006 Wolf ....................... H04L 1/206
348/478

(Continued)

FOREIGN PATENT DOCUMENTS

EP          3139620 A1    3/2017
JP       2007-221211 A    8/2007

(Continued)

OTHER PUBLICATIONS

International Search Report and Written Opinion of PCT Application No. PCT/JP2021/009717, issued on Jun. 8, 2021, 09 pages of ISRWO.

*Primary Examiner* — Michael B. Pierorazio
(74) *Attorney, Agent, or Firm* — CHIP LAW GROUP

(57) ABSTRACT

To satisfactorily transmit uncompressed RAW data between devices. A transmission unit transmits uncompressed RAW data to an external device via an HDMI transmission path. For example, the uncompressed RAW data is uncompressed RAW data in a Bayer layout. Furthermore, for example, the bit depth of each pixel of the uncompressed RAW data is 16 bits, and the transmission unit transmits the uncompressed RAW data using the YC 12 bit transfer mode. For example, the transmission unit transmits metadata related to the uncompressed RAW data together with the uncompressed RAW data.

17 Claims, 19 Drawing Sheets

(56) References Cited

U.S. PATENT DOCUMENTS

| | | | | |
|---|---|---|---|---|
| 7,408,993 | B2 * | 8/2008 | Webster | H03F 3/191 |
| | | | | 375/257 |
| 7,672,380 | B2 * | 3/2010 | Ho | H04L 47/10 |
| | | | | 455/283 |
| 8,198,999 | B2 * | 6/2012 | White | H04B 3/56 |
| | | | | 340/12.32 |
| 8,266,657 | B2 * | 9/2012 | Margulis | H04N 21/43637 |
| | | | | 725/120 |
| 10,672,098 | B1 * | 6/2020 | Chemparathy | G09G 5/39 |
| 2006/0036788 | A1 * | 2/2006 | Galang | G09G 5/006 |
| | | | | 348/E7.051 |
| 2006/0117371 | A1 * | 6/2006 | Margulis | H04N 21/43632 |
| | | | | 725/100 |
| 2006/0119701 | A1 * | 6/2006 | King | A61B 90/361 |
| | | | | 348/E7.086 |
| 2006/0242669 | A1 * | 10/2006 | Wogsberg | H04N 21/2187 |
| | | | | 725/135 |
| 2007/0103204 | A1 * | 5/2007 | Egan | H04L 25/14 |
| | | | | 327/100 |
| 2009/0049498 | A1 * | 2/2009 | Li | G09G 5/006 |
| | | | | 725/127 |
| 2009/0134996 | A1 * | 5/2009 | White, II | H04B 3/56 |
| | | | | 340/538 |
| 2010/0043045 | A1 * | 2/2010 | Shakiba | H04B 3/32 |
| | | | | 725/127 |
| 2010/0104029 | A1 * | 4/2010 | Lee | H04B 3/50 |
| | | | | 375/295 |
| 2012/0033129 | A1 * | 2/2012 | Miura | H04N 21/43635 |
| | | | | 348/E7.003 |
| 2012/0177133 | A1 * | 7/2012 | Oldenkamp | H04B 3/54 |
| | | | | 375/257 |
| 2012/0183085 | A1 * | 7/2012 | Hurwitz | H04B 3/54 |
| | | | | 375/258 |
| 2012/0187961 | A1 * | 7/2012 | Hashim | G01R 31/68 |
| | | | | 324/649 |
| 2012/0187964 | A1 * | 7/2012 | Michaelis | G01R 31/68 |
| | | | | 324/658 |
| 2012/0188865 | A1 * | 7/2012 | Michaelis | G01R 31/68 |
| | | | | 370/200 |
| 2016/0219240 | A1 * | 7/2016 | Suzuki | G09G 5/006 |
| 2017/0070654 | A1 * | 3/2017 | Ochi | A61B 1/317 |
| 2017/0100020 | A1 * | 4/2017 | Ochi | A61B 1/0676 |
| 2017/0245890 | A1 * | 8/2017 | Ochi | A61B 1/0684 |
| 2018/0124306 | A1 * | 5/2018 | Mikawa | H04N 23/667 |
| 2019/0098227 | A1 * | 3/2019 | Park | H04N 23/90 |
| 2019/0133513 | A1 * | 5/2019 | Patwardhan | A61B 5/0077 |
| 2020/0228689 | A1 * | 7/2020 | Kim | H04N 23/88 |
| 2020/0267291 | A1 * | 8/2020 | Drazic | H04N 25/135 |

FOREIGN PATENT DOCUMENTS

| | | |
|---|---|---|
| JP | 2010-028261 A | 2/2010 |
| JP | 2010-122743 A | 6/2010 |
| JP | 2011-146894 A | 7/2011 |

* cited by examiner

FIG. 7A
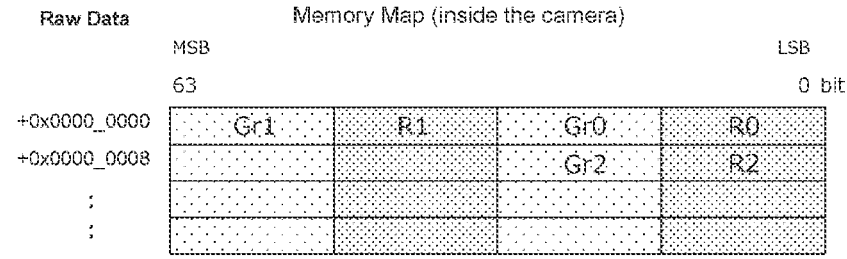
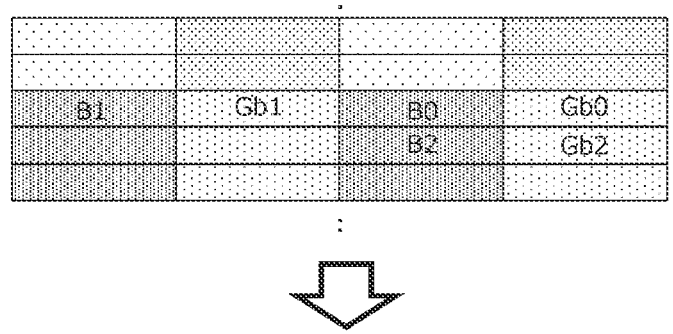
FIG. 7B
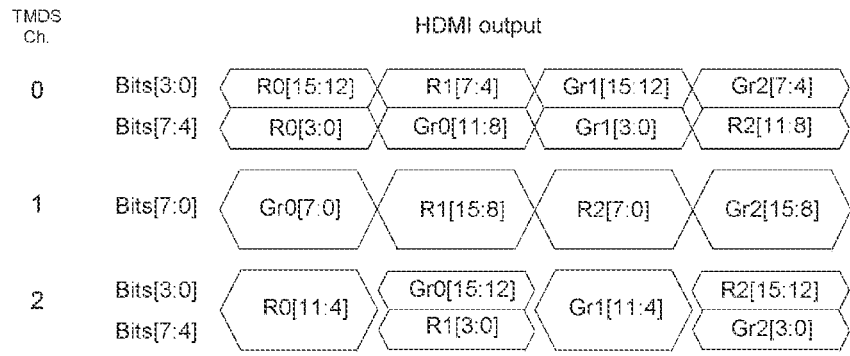
FIG. 7C
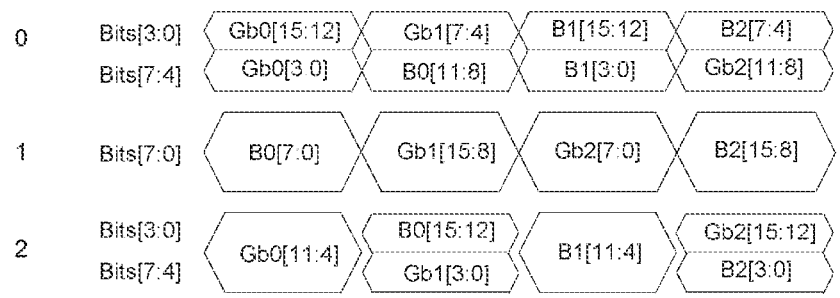

FIG. 9

| Byte | bits | | | | | | | |
|---|---|---|---|---|---|---|---|---|
| | 7 | 6 | 5 | 4 | 3 | 2 | 1 | 0 |
| HB0 | 0x81 | | | | | | | |
| HB1 | 0x01 | | | | | | | |
| HB2 | 0 | 0 | 0 | Length (L) | | | | |
| PB0 | checksum | | | | | | | |
| PB1 | IEEE OUI | | | | | | | |
| PB2 | IEEE OUI | | | | | | | |
| PB3 | IEEE OUI | | | | | | | |
| PB4 | 0x02 (TBD) | | | | | | | |
| PB5 | RT Metadata 0 | | | | | | | |
| PB6 | RT Metadata 1 | | | | | | | |
| PB7 | RT Metadata 2 | | | | | | | |
| PB8 | RT Metadata 3 | | | | | | | |
| PB9 | RT Metadata 4 | | | | | | | |
| PB10 | RT Metadata 5 | | | | | | | |
| PB11 | RT Metadata 6 | | | | | | | |
| PB12 | RT Metadata 7 | | | | | | | |
| PB13 | RT Metadata 8 | | | | | | | |
| PB14 | RT Metadata 9 | | | | | | | |
| PB15 | RT Metadata 10 | | | | | | | |
| PB16 | RT Metadata 11 | | | | | | | |
| PB17 | ST Metadata Number of Pages (0-255) | | | | | | | |
| PB18 | ST Metadata Page# | | | | | | | |
| PB19 | ST Metadata 0 | | | | | | | |
| PB20 | ST Metadata 1 | | | | | | | |
| PB21 | ST Metadata 2 | | | | | | | |
| PB22 | ST Metadata 3 | | | | | | | |
| PB23 | ST Metadata 4 | | | | | | | |
| PB24 | ST Metadata 5 | | | | | | | |
| PB25 | ST Metadata 6 | | | | | | | |
| PB26 | ST Metadata 7 | | | | | | | |

FIG. 10

| Byte | bits | | | | | | | |
|---|---|---|---|---|---|---|---|---|
| | 7 | 6 | 5 | 4 | 3 | 2 | 1 | 0 |
| HB0 | 0x81 | | | | | | | |
| HB1 | 0x01 | | | | | | | |
| HB2 | 0 | 0 | 0 | Length (L) | | | | |
| PB0 | checksum | | | | | | | |
| PB1 | IEEE OUI | | | | | | | |
| PB2 | IEEE OUI | | | | | | | |
| PB3 | IEEE OUI | | | | | | | |
| PB4 | 0x02 (TBD) | | | | | | | |
| PB5 | RT Metadata 0 | | | | | | | |
| PB6 | RT Metadata 1 | | | | | | | |
| PB7 | RT Metadata 2 | | | | | | | |
| PB8 | RT Metadata 3 | | | | | | | |
| PB9 | ST Metadata Number of Pages (0-255) | | | | | | | |
| PB10 | ST Metadata Page# | | | | | | | |
| PB11 | ST Metadata 0 | | | | | | | |
| PB12 | ST Metadata 1 | | | | | | | |
| PB13 | ST Metadata 2 | | | | | | | |
| PB14 | ST Metadata 3 | | | | | | | |
| PB15 | ST Metadata 4 | | | | | | | |
| PB16 | ST Metadata 5 | | | | | | | |
| PB17 | ST Metadata 6 | | | | | | | |
| PB18 | ST Metadata 7 | | | | | | | |
| PB19 | ST Metadata 8 | | | | | | | |
| PB20 | ST Metadata 9 | | | | | | | |
| PB21 | ST Metadata 10 | | | | | | | |
| PB22 | ST Metadata 11 | | | | | | | |
| PB23 | ST Metadata 12 | | | | | | | |
| PB24 | ST Metadata 13 | | | | | | | |
| PB25 | ST Metadata 14 | | | | | | | |
| PB26 | ST Metadata 15 | | | | | | | |

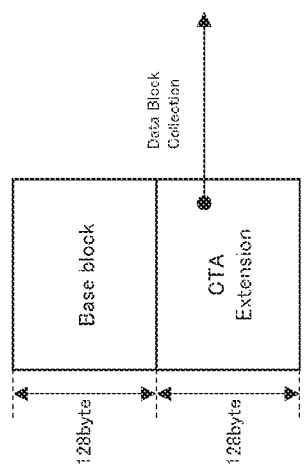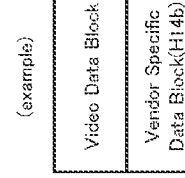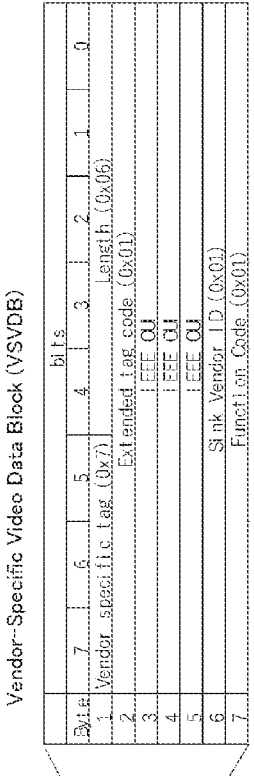

FIG. 15

| Offset | Bit 7 | Bit 6 | Bit 5 | Bit 4 | Bit 3 | Bit 2 | Bit 1 | Bit 0 |
|---|---|---|---|---|---|---|---|---|
| 0xD0 | Manufacture_OUI |||||||||
| 0xD1 | Manufacture_OUI |||||||||
| 0xD2 | Manufacture_OUI |||||||||
| 0xD3-0xDA | Device ID:Device_ID_String |||||||||
| 0xDB | Device ID:Hardware_Major_Rev |||| Device ID:Hardware_Minor_Rev ||||
| 0xDC | Device ID:Software_Major_Rev ||||||||
| 0xDD | Device ID:Software_Minor_Rev ||||||||
| 0xDE | Sink Vendor ID (0x01) ||||||||
| 0xDF | Function Code (0x01) ||||||||
| 0xE0 | SIGNAL STOP REQUEST | reserve | reserve | reserve | reserve | reserve | reserve | RAW RECEPTION REQUEST |
| 0xE1 | reserve | reserve | reserve | reserve | reserve | reserve | reserve | REC STATUS |

TRANSMISSION DEVICE, TRANSMISSION METHOD, AND RECEPTION DEVICE

CROSS REFERENCE TO RELATED APPLICATIONS

This application is a U.S. National Phase of International Patent Application No. PCT/JP2021/009717 filed on Mar. 11, 2021, which claims priority benefit of Japanese Patent Application No. JP 2020-048240 filed in the Japan Patent Office on Mar. 18, 2020. Each of the above-referenced applications is hereby incorporated herein by reference in its entirety.

TECHNICAL FIELD

The present technology relates to a transmission device, a transmission method, and a reception device, and more particularly, to a transmission device or the like that transmits uncompressed RAW data to an external device.

BACKGROUND ART

For example, Patent Document 1 discloses that YC data as image data, for example, YcbCr 4:2:2 system image data is transmitted uncompressed from a source device to a sink device via a high-definition multimedia interface (HDMI) transmission path to transmit in compression. Note that the "HDMI" is a registered trademark.

For example, in a case where the image data is transmitted from an imaging device as the source device to a reception device as the sink device, in consideration of processing such as editing and image quality adjustment on the reception device side, it is desirable to transmit the image data in a form of RAW data instead of the form of YC data and to store the image data in the form of the RAW data.

Here, the image data output from the imager that is not converted into YC data is referred to as RAW data. The RAW data may be the output image data of the imager itself as long as an arrangement relationship of color filters of an imager such as a Bayer layout is maintained, or the output image data may be subjected to processing such as noise reduction, defect correction, and automatic white balance.

CITATION LIST

Patent Document

Patent Document 1: Japanese Patent Application Laid-Open No. 2010-028261

SUMMARY OF THE INVENTION

Problems to be Solved by the Invention

An object of the present technology is to satisfactorily transmit uncompressed RAW data between devices.

Solutions to Problems

A concept of the present technology is a transmission device including a transmission unit configured to transmit uncompressed RAW data to an external device via an HDMI transmission path.

In the present technology, the transmission unit transmits the uncompressed RAW data to the external device via the HDMI transmission path. For example, the uncompressed RAW data may be uncompressed RAW data in a Bayer layout. In this case, for example, the bit depth of each pixel of the uncompressed RAW data may be 16 bits, and the transmission unit may transmit the uncompressed RAW data using the YC 12 bit transfer mode.

Furthermore, for example, the transmission unit may transmit metadata related to the uncompressed RAW data together with the uncompressed RAW data. The metadata includes information such as the size of the image and parameters for development (brightness, gain, and the like at the time of imaging). By transmitting the metadata related to the uncompressed RAW data together with the uncompressed RAW data in this way, on the reception side, the metadata related to the uncompressed RAW data can be appropriately and easily acquired in association with the uncompressed RAW data.

In this case, for example, the transmission unit may add metadata to each frame of the uncompressed RAW data and transmit the metadata. In this case, for example, the transmission unit may store the uncompressed RAW data in an active video interval of transition minimized differential signaling (TMDS) transmission data including the active video interval and a vertical blanking interval, and store and transmit the metadata in a payload portion of a data packet inserted into the vertical blanking interval. For example, the data packet may be a Vendor Specific InfoFrame (VSIF) packet.

In this case, for example, the metadata may include high-update frequency metadata of a first update frequency and low-update frequency metadata of a second update frequency lower than the first update frequency, and a payload portion of the data packet may include a first area in which the high-update frequency metadata is stored and a second area in which the low-update frequency metadata is stored. In this case, for example, in the second area, a page number area in which information of a page number is stored may be included, and metadata corresponding to the page number may be stored.

In this case, for example, in the second area, a total number of pages area for storing information of a total number of pages may be further included. Furthermore, in this case, for example, a transmission frequency of metadata corresponding to each page stored and transmitted in the second area may be changed according to a priority of each piece of metadata.

Furthermore, for example, the transmission unit may store the uncompressed RAW data in an active video interval of transition minimized differential signaling (TMDS) transmission data including the active video interval, and store and transmit the metadata in an area of the active video interval where the uncompressed RAW data is not stored.

Furthermore, for example, the transmission unit may transmit identification information indicating that the uncompressed RAW data is being transmitted together with the uncompressed RAW data. By transmitting the identification information indicating the transmission of the uncompressed RAW data together with the uncompressed RAW data in this manner, on the reception side, it is possible to easily identify that the transmission is uncompressed RAW data, and it is possible to perform appropriate processing.

In this case, for example, the transmission unit may store the uncompressed RAW data in an active video interval of transition minimized differential signaling (TMDS) transmission data including the active video interval and a vertical blanking interval, and insert and transmit identification information into the vertical blanking interval. In this case, for example, the transmission unit may insert a predetermined data packet into the vertical blanking interval as the identification information. Then, in this case, for example, metadata related to the uncompressed RAW data may be stored in a payload portion of the predetermined data packet.

Furthermore, for example, an imager configured to output the uncompressed RAW data may be further included. Furthermore, for example, the transmission unit may further have a function of transmitting YC data obtained by developing the uncompressed RAW data to the external device via the HDMI transmission path.

As described above, in the present technology, the uncompressed RAW data is transmitted to the external device via the HDMI transmission path, and the uncompressed RAW data can be satisfactorily transmitted between the devices.

Furthermore, another concept of the present technology is a reception device including:
- a reception unit configured to receive uncompressed RAW data from an external device via an HDMI transmission path; and
- a processing unit configured to process the uncompressed RAW data received by the reception unit.

In the present technology, the reception unit receives the uncompressed RAW data from the external device via the HDMI transmission path. Then, the uncompressed RAW data received by the reception unit is processed by the processing unit.

As described above, in the present technology, uncompressed RAW data is received from the external device via the HDMI transmission path and processed, and image data editing processing, image quality adjustment processing, and the like can be favorably performed.

BRIEF DESCRIPTION OF DRAWINGS

FIGS. 7A, 7B, and 7C are diagrams illustrating a memory map and a packing format in a case where uncompressed RAW data is transmitted.

FIG. 9 is a diagram illustrating an example of a data structure of a VSIF packet.

FIG. 10 is a diagram illustrating another example of the data structure of the VSIF packet.

FIGS. 11A, 11B, and 11C are diagrams illustrating an example of a basic structure of EDID and a structure of VSVDB defined in an extended block thereof.

FIG. 15 is a diagram illustrating an example of a data structure in a manufacturer specific register.

MODE FOR CARRYING OUT THE INVENTION

Hereinafter, modes for carrying out the invention (hereinafter, referred to as "embodiment") will be described. Note that the description will be given in the following order.

1. Embodiments

2. Modification Example

1. Embodiments

[Configuration Example of Imaging System]

Figure 1:
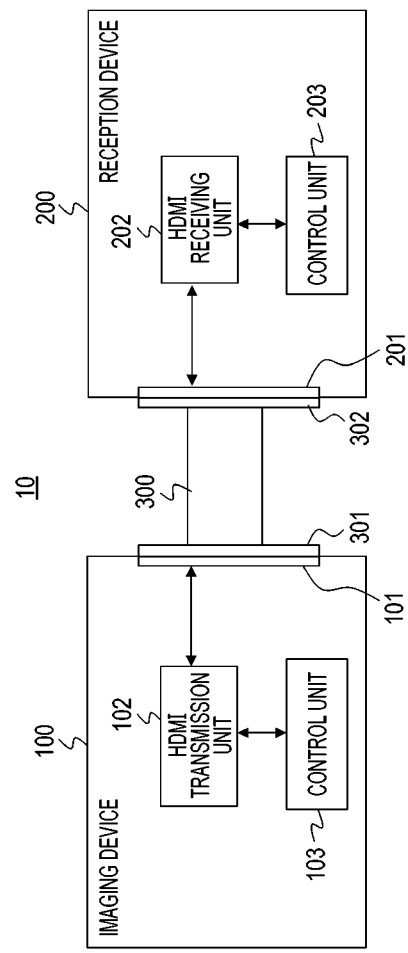
FIG. 1 is a block diagram illustrating a configuration example of an imaging system as an embodiment.

FIG. 1 illustrates a configuration example of an imaging system 10 as an embodiment. The imaging system 10 is configured by connecting an imaging device 100 as a source device and a reception device 200 as a sink device. The imaging device 100 and the reception device 200 are connected via an HDMI cable 300 which is a digital interface cable.

The imaging device 100 includes an HDMI transmission unit 102 and a control unit 103. The control unit 103 controls the entire imaging device 100. Furthermore, the imaging device 100 is provided with a receptacle 101 as an HDMI connector to which the HDMI transmission unit 102 is connected. The reception device 200 includes an HDMI receiving unit 202 and a control unit 203. The control unit 203 controls the entire reception device 200. Further, the reception device 200 is provided with a receptacle 201 as an HDMI connector to which the HDMI receiving unit 202 is connected.

The HDMI cable 300 configures an HDMI transmission path. A plug 301 configuring an HDMI connector is provided at one end of the HDMI cable 300, and a plug 302 configuring the HDMI connector is provided at the other end thereof. The plug 301 at one end of the HDMI cable 300 is connected to the receptacle 101 of the imaging device 100, and the plug 302 at the other end of the HDMI cable 300 is connected to the receptacle 201 of the reception device 200.

In the imaging system 10 illustrated in FIG. 1, for example, in a case where the reception device 200 supports the uncompressed RAW data and it is selected to output the uncompressed RAW data, the imaging device 100 transmits the uncompressed RAW data to the reception device 200 via the HDMI cable 300 by communication conforming to HDMI.

Furthermore, in the imaging system 10 illustrated in FIG. 1, for example, in a case where it is selected not to output the RAW data and it is selected to output YC data even if the reception device 200 supports the uncompressed RAW data, the imaging device 100 transmits the uncompressed YC data obtained by developing the uncompressed RAW data to the reception device 200 via the HDMI cable 300 by communication conforming to HDMI.

Furthermore, in the imaging system 10 illustrated in FIG. 1, for example, in a case where the reception device 200 does not support the uncompressed RAW data and it is selected to output the YC data, the imaging device 100 transmits the uncompressed YC data obtained by developing the uncompressed RAW data to the reception device 200 via the HDMI cable 300 by communication conforming to HDMI.

Furthermore, in the imaging system 10 illustrated in FIG. 1, for example, in a case where it is selected not to output the RAW data and it is selected not to output the YC data even if the reception device 200 supports the uncompressed RAW data, or in a case where it is selected not to output the YC data because the reception device 200 does not support the uncompressed RAW data, the imaging device 100 does not transmit the uncompressed RAW data and the uncompressed YC data obtained by developing the uncompressed RAW data to the reception device 200.

"Configuration Examples of HDMI Transmission Unit and HDMI Receiving Unit"

Figure 2:
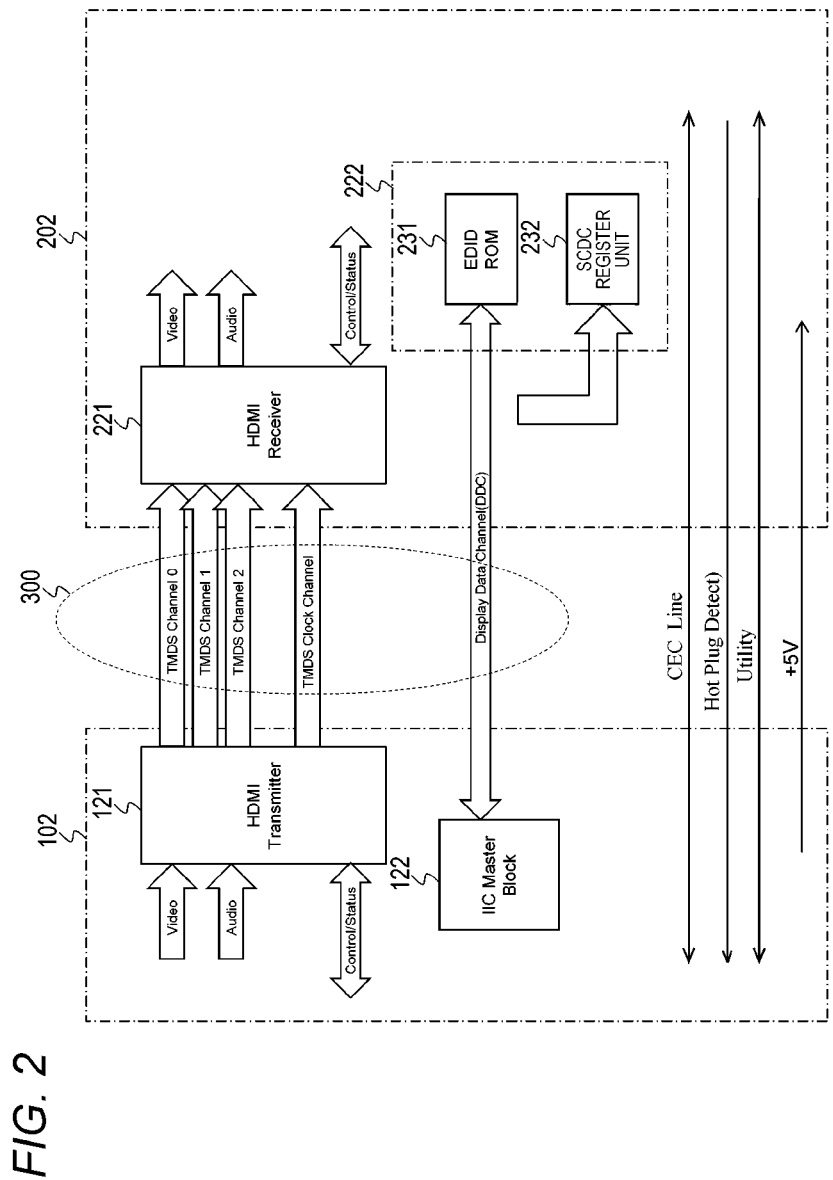
FIG. 2 is a block diagram illustrating configuration examples of an HDMI transmission unit of an imaging device and an HDMI receiving unit of a reception device.

FIG. 2 illustrates configuration examples of the HDMI transmission unit 102 of the imaging device 100 and the HDMI receiving unit 202 of the reception device 200 in the imaging system 10 of FIG. 1.

The HDMI transmission unit 102 transmits a differential signal corresponding to pixel data of an uncompressed image for one screen to the HDMI receiving unit 202 in one direction through a plurality of channels in an effective image interval that is an interval obtained by removing a horizontal blanking interval and a vertical blanking interval from an interval from one vertical synchronization signal to a next vertical synchronization signal (hereinafter, also referred to as an "active video interval" as appropriate), and transmits a differential signal corresponding to at least audio data, control data, other auxiliary data, or the like accompanying an image to the HDMI receiving unit 202 in one direction through a plurality of channels in the horizontal blanking interval or the vertical blanking interval.

That is, the HDMI transmission unit 102 includes an HDMI transmitter 121. For example, the HDMI transmitter 121 converts pixel data of an uncompressed image into a differential signal, and serially transmits the differential signal in one direction to the HDMI receiving unit 202 connected via the HDMI cable 300 through three TMDS channels # 0, # 1, and # 2 which are a plurality of channels.

Furthermore, the HDMI transmitter 121 converts audio data accompanying the uncompressed image, necessary control data, other auxiliary data, and the like into differential signals, and serially transmits the differential signals in one direction to the HDMI receiving unit 202 connected via the HDMI cable 300 through the three TMDS channels # 0, # 1, and # 2.

Moreover, the HDMI transmitter 121 transmits a pixel clock synchronized with the pixel data transmitted through the three TMDS channels # 0, # 1, and # 2 to the HDMI receiving unit 202 connected via the HDMI cable 300 through the TMDS clock channel. Here, in one TMDS channel # i (i=0, 1, 2), 10 bit pixel data is transmitted during one clock of the pixel clock.

Here, the TMDS coding is 8-bit/10 bit conversion coding for converting 8-bit data into 10 bit data, and is coding for maintaining DC balance while suppressing adverse effects such as unnecessary radiation by reducing transition points from comparison with previous data. Therefore, since the run-length of coding cannot be theoretically guaranteed, DC coupling and separate transmission of a clock are essential.

The HDMI receiving unit 202 receives the differential signals corresponding to the pixel data transmitted in one direction from the HDMI transmission unit 102 through a plurality of channels in the active video interval, and receives the differential signals corresponding to the audio data and the control data transmitted in one direction from the HDMI transmission unit 102 through a plurality of channels in the horizontal blanking interval or the vertical blanking interval.

That is, the HDMI receiving unit 202 includes an HDMI receiver 221. The HDMI receiver 221 receives the differential signal corresponding to the pixel data and the differential signal corresponding to the audio data and the control data transmitted in one direction from the HDMI transmission unit 102 connected via the HDMI cable 300 in synchronization with the pixel clock similarly transmitted from the HDMI transmission unit 102 through the TMDS clock channel through the TMDS channels # 0, # 1, and # 2.

The transmission channel of the HDMI system including the HDMI transmission unit 102 and the HDMI receiving unit 202 includes a transmission channel called a display data channel (DDC). The DDC includes two signal lines (not illustrated) included in the HDMI cable 300, and performs inter-integrated circuit (IIC) communication between the HDMI transmission unit 102 and the HDMI receiving unit 202.

That is, the HDMI transmission unit 102 includes an IIC master block 122. Furthermore, the HDMI receiving unit 202 includes a memory unit 222. The memory unit 222 includes an extended display identification data ROM (EDID ROM) 231, a status and control data channel (SCDC) register unit 232, and the like.

In the EDID ROM 231, EDID, which is information regarding the configuration and possible functions (configuration/capability) of the reception device 200, is set and read by the IIC master block 122 to the imaging device 100 side through DDC. Therefore, the imaging device 100 recognizes the configuration and possible functions of the reception device 200. Note that the EDID ROM 231 is realized by, for example, a rewritable memory such as an electrically erasable programmable read-only memory (EEPROM) or a flash memory, but may be realized by a random access memory (RAM) or any other storage medium.

The SCDC corresponds to a point to point communication protocol in which the source device and the sink device exchange data. Note that this SCDC is defined after HDMI 2.0. The SCDC register unit 232 includes a register group that stores an SCDC structure (SCDCS). The imaging device 100 (the HDMI transmission unit 102) can read and write the data of the SCDCS stored in the SCDC register unit 232 by the IIC master block 122 through the DDC. The data of the SCDCS includes data related to the current link state, data for controlling the operation of the source device, and the like.

The transmission channel of the HDMI system includes a transmission channel called a consumer electronics control line (CEC line) in addition to the TMDS channels # 0 to # 2, the TMDS clock channel, and the DDC described above. The CEC line includes one signal line included in the HDMI cable 300, and is used to perform bidirectional communication of control data between the HDMI transmission unit 102 and the HDMI receiving unit 202. This CEC line constitutes a control data line.

Furthermore, the HDMI cable 300 includes a hot plug detect line (HPD line). The source device can detect the connection of the sink device using the HPD line. Note that, in FIG. 2, an arrow is attached to the HPD line to indicate one direction from the sink device to the source device. However, the HPD line is also used as an HDMI Ethernet and Audio return Channel (HEAC)–line constituting a bidirectional communication path, and in this case, the HPD line becomes a bidirectional line.

Furthermore, the HDMI cable 300 includes a power line (+5 V Power Line) used to supply power from the source device to the sink device. Moreover, the HDMI cable 300 includes a utility line. The utility line is also used as an HDMI Ethernet and Audio return Channel (HEAC)+line constituting a bidirectional communication path.

Figure 3:
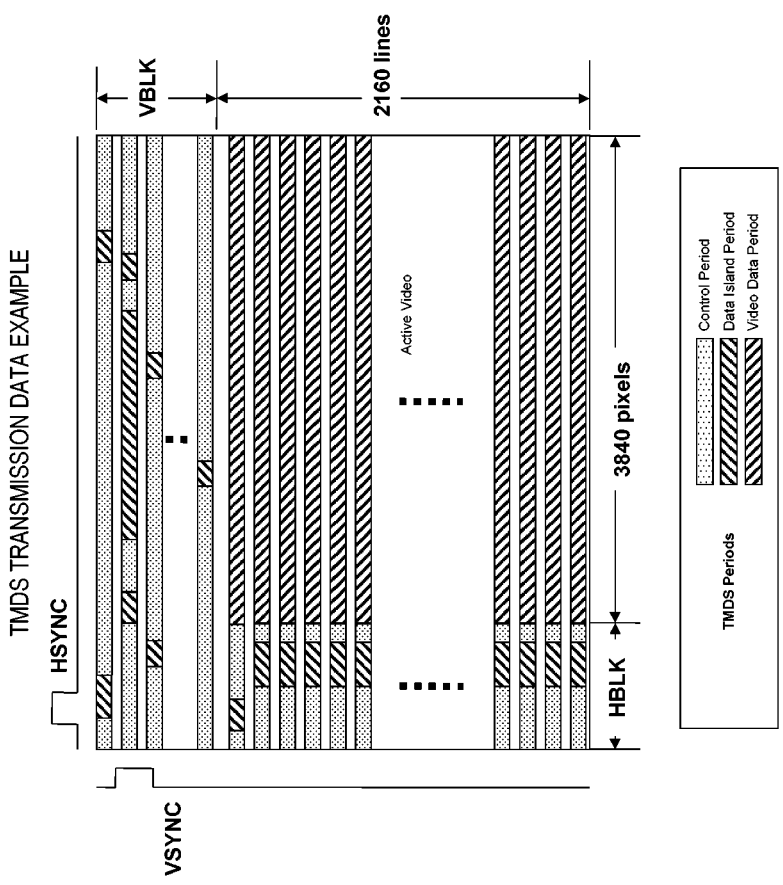
FIG. 3 is a diagram illustrating a structure example of TMDS transmission data.

FIG. 3 illustrates a structure example of the TMDS transmission data. FIG. 3 illustrates intervals of various types of transmission data in a case where image data of 3840 pixels×2160 lines in width×height, that is, image data of so-called 4K resolution, is transmitted in the TMDS channels # 0 to # 2, for example. In a video field interval in which transmission data is transmitted on a TMDS channel, three types of intervals exist according to a type of transmission data. These three types of periods are a video data period, a data island period, and a control period.

Here, the video field interval is a period from a rising edge (active edge) of a certain vertical synchronization signal to a rising edge of a next vertical synchronization signal. The video field interval is divided into a horizontal blanking interval, a vertical blanking interval, and an active video interval. The active video interval is an interval obtained by removing the horizontal blanking interval and the vertical blanking interval from the video field interval. The video data period is assigned to the active video interval. In this video data period, data of effective pixels (Active pixels) of 3840 pixels (pixels)×2160 lines constituting uncompressed image data of one screen is transmitted.

The data island period and the control period are assigned to the horizontal blanking interval and the vertical blanking interval. In the data island period and the control period, auxiliary data is transmitted. That is, the data island period is allocated to a part of the horizontal blanking interval and a part of the vertical blanking interval. In this data island period, among the auxiliary data, data not related to control, for example, a packet of audio data and the like are transmitted. The control period is assigned to other portions of the horizontal blanking interval and the vertical blanking interval. In the control period, for example, a vertical synchronization signal, a horizontal synchronization signal, a control packet, and the like, which are data related to control among the auxiliary data, are transmitted.

"RAW Data Packing Method"

Figure 4:
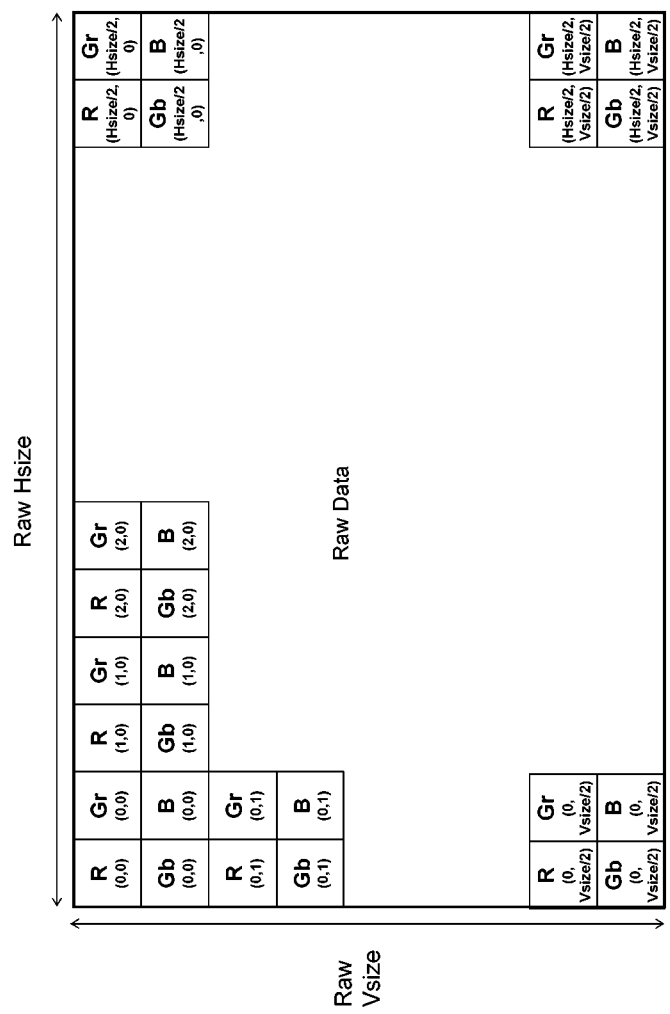
FIG. 4 is a diagram illustrating an image format of uncompressed RAW data.

In a case where the imaging device 100 transmits the uncompressed RAW data to the reception device 200, the HDMI transmission unit 102 packs and transmits the uncompressed RAW data in each of the TMDS channels # 0 to # 2. In this embodiment, the uncompressed RAW data is uncompressed RAW data in a Bayer layout as illustrated in an image format in FIG. 4.

In this embodiment, it is assumed that the uncompressed RAW data is image data of "Hsize" pixels×"Vsize" lines in width×height, and has a resolution of up to 4700×2600 pixels. Furthermore, it is assumed that a bit length of data of each pixel is 16 bits. Furthermore, the frame rate of the uncompressed RAW data is 59.94 fps, 29.97 fps, 23.98 fps, 50.00 fps, 25.00 fps, and the like.

Figure 5:
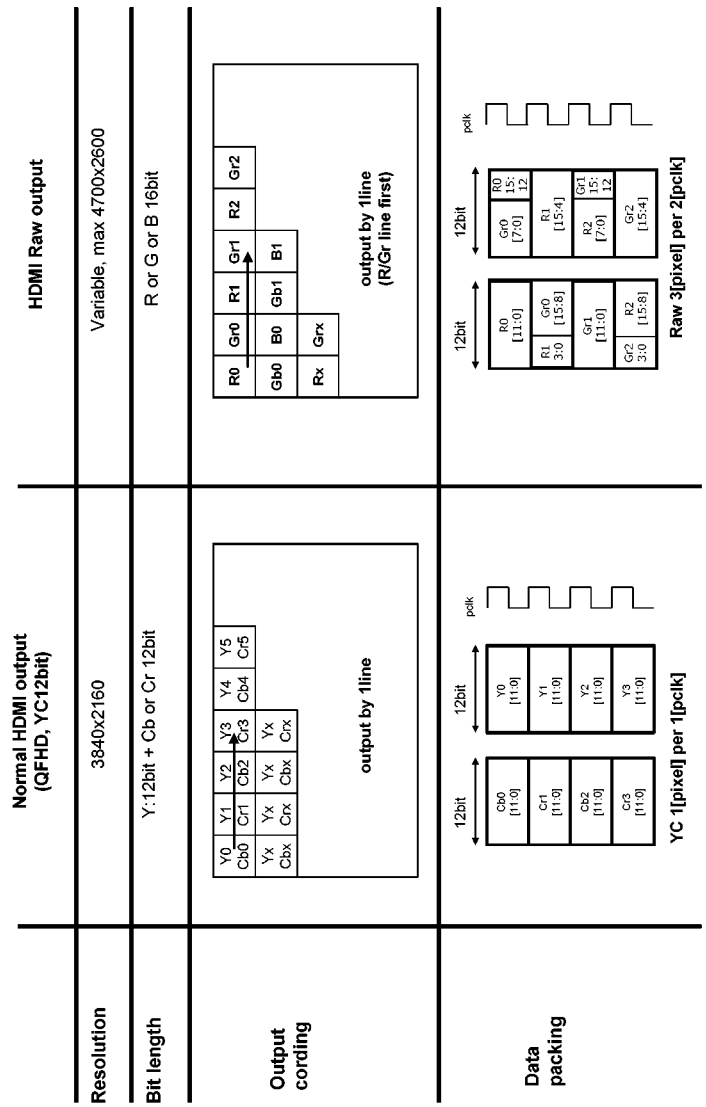
FIG. 5 is a diagram illustrating a case where uncompressed YC data having a resolution of 3840×2160 pixels is output as a normal HDMI output using a YC 12 bit transfer mode, and a case where uncompressed RAW data having a resolution of up to 4700×2600 pixels is output as an HDMI output using the YC 12 bit transfer mode.

In this embodiment, the uncompressed RAW data is transmitted using the YC 12 bit transfer mode. The left side of FIG. 5 illustrates a case where the uncompressed YC data having the resolution of 3840×2160 pixels is output as the normal HDMI output using the YC 12 bit transfer mode. Here, the uncompressed YC data is image data of the YCbCr 4:2:2 system. In the output coding, pixels of "Y: 12 bits+Cb: 12 bits" and pixels of "Y: 12 bits+Cr: 12 bits" are alternately continuous in each line. Regarding data packing, 24 bit (Y: 12 bit+C: 12 bit) data of one pixel of YC data is packed with respect to one pixel clock.

Figure 6A:
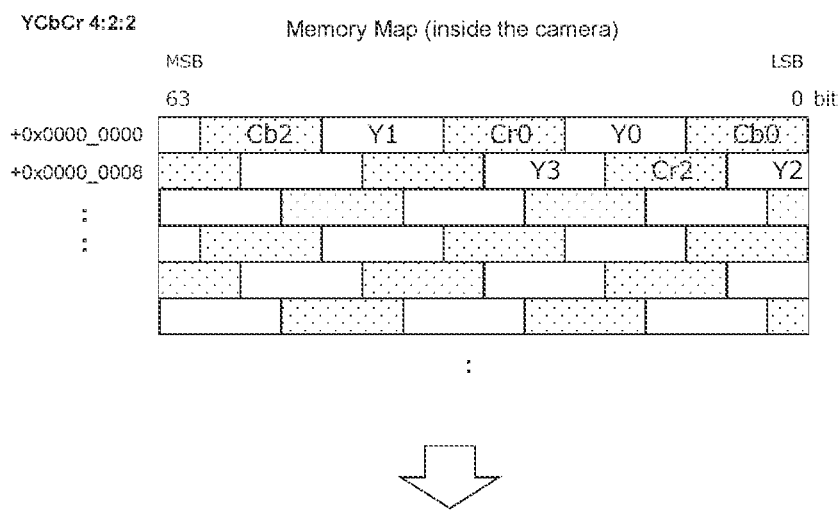
FIGS. 6A and 6B are diagrams illustrating a memory map and a packing format in a case where uncompressed YC data is transmitted.
Figure 6B:
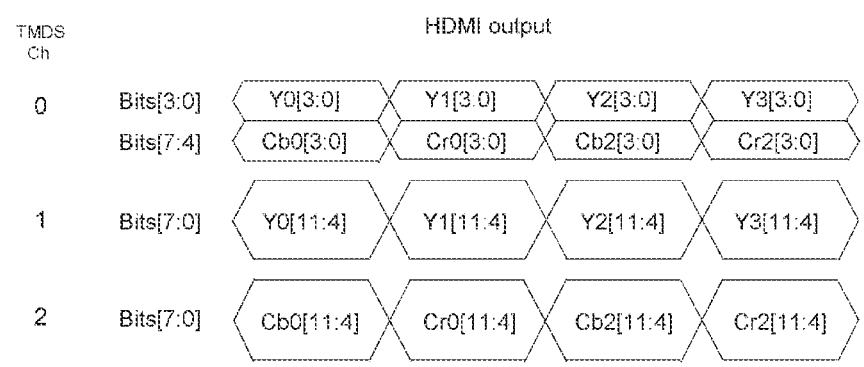

In this case, as illustrated in an example of a memory map in FIG. 6A, the data of each pixel of the uncompressed YC data is sequentially mapped to the memory, then the data of each pixel is sequentially read from the memory, and as illustrated in a packing format in FIG. 6B, the data is packed in each channel of the TMDS channels #0 to #2 to be the HDMI output. Here, in each pixel clock, lower 4 bits of C data are high-order 4-bit data of the TMDS channel 0, upper 8 bits of the C data are 8-bit data of the TMDS channel 2, lower 4 bits of Y data are low-order 4-bit data of the TMDS channel 0, and upper 8 bits of the Y data are 8-bit data of the TMDS channel 1.

The right side of FIG. 5 illustrates a case where uncompressed RAW data having a resolution of up to 4700×2600 pixels is output as the HDMI output using the YC 12 bit transfer mode. Here, the uncompressed RAW data is of the Bayer layout as described above, and a bit length of data of each pixel is 16 bits. In the output coding, a pixel of "R: 16 bits" and a pixel of "Gr: 16 bits" are alternately continuous in an odd line (R/Gr line), and a pixel of "Gb: 16 bits" and a pixel of "B: 16 bits" are alternately continuous in an even line (B/Gb line). Regarding data packing, 48 bit data of 3 pixels of uncompressed RAW data is packed for 2 pixel clocks.

In this case, as illustrated in an example of a memory map in FIG. 7A, the data of each pixel of the uncompressed RAW data is sequentially written to the memory, then the data of each pixel is sequentially read from the memory, and as illustrated in a packing format in FIGS. 7B and 7C, the data is packed in each channel of the TMDS channels #0 to #2 to be the HDMI output. Here, FIG. 7B illustrates the packing format of the odd lines (R/Gr lines), and FIG. 7C illustrates the packing format of the even lines (B/Gb lines). In this case, two consecutive pixel clocks are the packing cycle.

For odd lines (R/Gr lines), the first two pixel clocks are packed as follows. That is, in the first pixel clock, the lower 4 bits of the R0 data are the upper 4 bits of the TMDS channel 0, the middle 8 bits of the R0 data are the 8 bits of the TMDS channel 2, the upper 4 bits of the R0 data are the lower 4 bits of the TMDS channel 0, and the lower 8 bits of the Gr0 data are the 8 bits of the TMDS channel 1.

Furthermore, in the second pixel clock, the middle 4 bits of Gr0 data are set to the upper 4 bits of the TMDS channel 0, the upper 4 bits of Gr0 data are set to the lower 4 bits of the TMDS channel 2, the lower 4 bits of R1 data are set to the upper 4 bits of the TMDS channel 2, the middle 4 bits of R1 data are set to the lower 4 bits of the TMDS channel 0, and the upper 8 bits of R1 data are set to the 8 bits of the TMDS channel 1.

Furthermore, regarding the even lines (B/Gb lines), in the first two pixel clocks, packing is performed as follows. That is, in the first pixel clock, the lower 4 bits of the Gb0 data are the upper 4 bits of the TMDS channel 0, the middle 8 bits of the Gb0 data are the 8 bits of the TMDS channel 2, the upper 4 bits of the Gb0 data are the lower 4 bits of the TMDS channel 0, and the lower 8 bits of the B0 data are the 8 bits of the TMDS channel 1.

Furthermore, in the second pixel clock, the middle 4 bits of B0 data are set to the upper 4 bits of the TMDS channel 0, the upper 4 bits of B0 data are set to the lower 4 bits of the TMDS channel 2, the lower 4 bits of Gb1 data are set to the upper 4 bits of the TMDS channel 2, the middle 4 bits of Gb1 data are set to the lower 4 bits of the TMDS channel 0, and the upper 8 bits of Gb1 data are set to the 8 bits of the TMDS channel 1.

Figure 8:
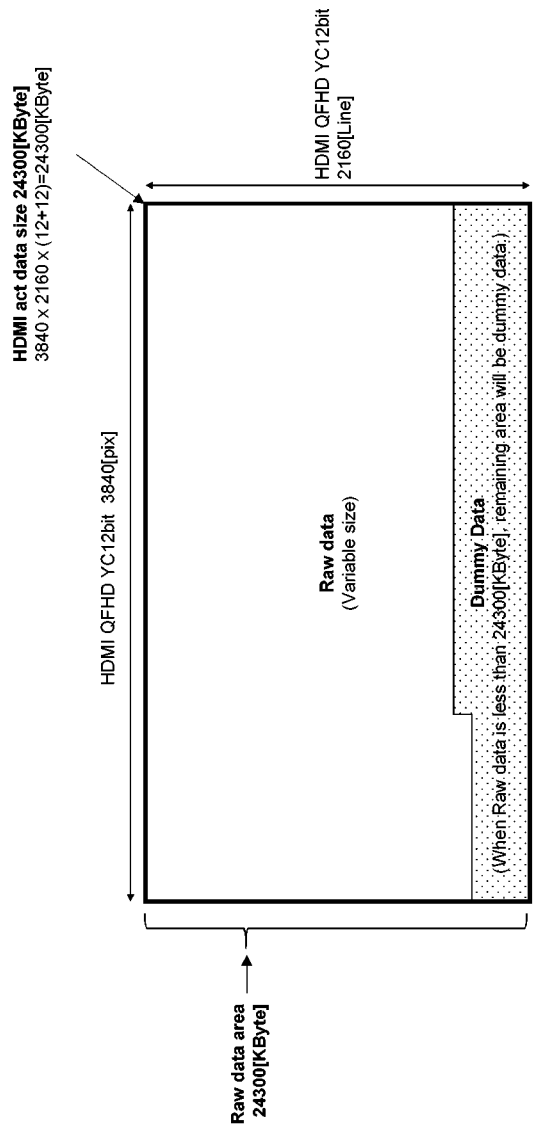
FIG. 8 is a diagram for illustrating a state in which uncompressed RAW data having a resolution of up to 4700×2600 pixels and a bit length of 16 bits for each pixel is stored in an active video interval of TMDS transmission data in a case where uncompressed YC 12 bit image data of 3840 pixels×2160 lines in width×height is transmitted.

FIG. 8 illustrates an active video interval (see FIG. 3) of TMDS transmission data in a case where uncompressed YC 12 bit image data of 3840 pixels×2160 lines in width×height is transmitted. In this case, the data size of the active video interval is 24300 [Kbyte] (=3840×2160×(12+12) [bit]).

As described above, the uncompressed RAW data has a resolution of up to 4700×2600 pixels, and the maximum data size of one frame of the uncompressed RAW data is smaller than 24300 [Kbyte], which is the data size of the active video interval. In a case where the uncompressed RAW data is transmitted, the uncompressed RAW data for one frame is stored in the active video interval and transmitted in each frame by being packed as described above. In this case, in each frame, the uncompressed RAW data for one frame is packed from the beginning of the active video interval, but after all the uncompressed RAW data for one frame is packed, the dummy data is packed in the remaining interval.

"Metadata Transfer Method"

In a case where the uncompressed RAW data is transmitted from the imaging device 100 to the reception device 200, metadata related to the uncompressed RAW data is transmitted together with the uncompressed RAW data. In this case, for example, the metadata is added to each frame of the uncompressed RAW data and transmitted. For example, the metadata is transmitted in a state of being added to each frame of the uncompressed RAW data by being stored in a payload portion of a data packet inserted into the vertical blanking interval of the TMDS transmission data. In this embodiment, the data packet is a Vendor Specific Infoframe (VSIF) packet. Note that, in the present technology, the data packet is the VSIF packet.

FIG. 9 illustrates an example of a data structure of the VSIF packet. Three bytes HB0 to HB2 constitute a packet header which is a header portion of the VSIF packet. In the 0th byte (HB0), PacketType (0x81) indicating a VSIF packet is defined. In the 1st byte (HB1), a version (0x01) of the VSIF packet is defined. A data length Length (L) of the payload portion of the VSIF packet is defined in the 4th bit to the 0th bit of the 2nd byte (HB2). In the illustrated example, the data length Length (L) indicates 27 [Byte].

27 bytes of PB0 to PB26 constitute packet content which is a payload portion of the VSIF packet. In the 0th byte (PB0), a checksum of data is defined. In the 1st byte (PB1) to the 3rd byte (PB3), a 24 bit IEEE Organizationally Unique Identifier (OUI) of a product vendor is arranged. In the 4th byte (PB4), a version (for example, 0x02) indicating a new VSIF packet for transmitting metadata related to uncompressed RAW data is defined.

12 bytes of the 5th byte (PB5) to the 16th byte (PB16) are set as a real-time (RT) metadata area. Since the real-time metadata area can be updated every frame, real-time metadata which is metadata having a high update frequency, for example, a time code, a Rec trigger, brightness information, a color conversion matrix, and the like are stored in the real-time metadata area.

10 bytes of the 17th byte (PB17) to the 26th byte (PB26) are an area related to static (ST) metadata. The 17th byte (PB17) constitutes the total number of pages area, and stores information "ST Metadata Number of Pages" of the total number of pages. In this case, values of 0 to 255 indicate a total number of pages of 1 to 256. The 18th byte (PB18) constitutes a page number area and stores page number information "ST Metadata Page # ".

8 bytes from the 19th byte (PB19) to the 26th byte (PB26) constitute a static (ST) metadata area, and static metadata corresponding to a page number and being metadata having a lower update frequency than the above-described real-time metadata, for example, a model name of a camera, brightness of a lens, a size of an image, a data bit length, and the like are stored.

In this case, since the maximum of the static metadata that can be transmitted per page is 8 [Byte] and the maximum of the total number of pages is 256 pages, the maximum of the static metadata that can be transmitted by the VSIF packet is 2048 (=256×8) [Byte].

FIG. 10 illustrates another example of the data structure of the VSIF packet. In this example, the size ratio between the real-time (RT) metadata area and the static (ST) metadata area is changed from the example of the data structure of the VSIF packet illustrated in FIG. 9. In this example, 4 bytes of the 5th byte (PB5) to the 8th byte (PB8) are set as the real-time (RT) metadata area, and 16 bytes of the 11th byte (PB11) to the 26th byte (PB26) are set as the static (ST) metadata area.

In this case, since the maximum of the static metadata that can be transmitted per page is 16 [Byte] and the maximum of the total number of pages is 256 pages, the maximum of the static metadata that can be transmitted by the VSIF packet is 4096 (=256×16) [Byte].

Note that, in the case the static metadata is transmitted in the VSIF packet described above, it is assumed that the static metadata is transmitted while the page number is regularly incremented as 0, 1, 2, . . . in each frame. Alternatively, the transmission frequency of the metadata corresponding to each page may be changed according to the priority of the metadata.

For example, in a case where there are up to 0 to 9 pages, there is almost no update of the metadata of 2 to 9 pages, and the update frequency of the metadata of the remaining 0 and 1 pages is high, the transmission frequency of 0 and 1 pages may be higher than the transmission frequency of 2 to 9 pages. In this case, for example, the metadata of each page is always transmitted in the order of 0, 1, 0, 1, . . . , and the metadata of each page is occasionally transmitted in the order of 0, 1, . . . , 9.

By transmitting the metadata related to the uncompressed RAW data together with the uncompressed RAW data in this way, on the reception side, the metadata related to the uncompressed RAW data can be appropriately and easily acquired in association with the uncompressed RAW data.

"Transmission Identification Information of Uncompressed RAW Data"

In a case where the uncompressed RAW data is transmitted from the imaging device 100 to the reception device 200, identification information indicating that the uncompressed RAW data is transmitted together with the uncompressed RAW data. In this embodiment, as described above, the VSIF packet in which the uncompressed RAW data is stored in the payload portion also has a function of identification information indicating that the VSIF packet is transmission of the uncompressed RAW data. Since, on the reception side, the VSIF packet is present, it is possible to easily identify that the transmission is uncompressed RAW data, and it is possible to perform appropriate processing.

"Output Control Processing"

The control unit 103 of the imaging device 100 controls whether to transmit the uncompressed RAW data to the reception device 200, transmit the uncompressed YC data to the reception device 200, or transmit nothing on the basis of information such as whether the reception device 200 supports the uncompressed RAW data.

As described above, the HDMI receiving unit 202 of the reception device 200 includes the memory unit 222, and the memory unit 222 includes the EDID ROM 231 in which the information regarding the configuration and the possible functions of the reception device 200 is set (see FIG. 2). In the present embodiment, in a case where the reception device 200 supports uncompressed RAW data, the identification information indicating that reception device 200 supports uncompressed RAW data is included in a Vendor-Specific Video Data Block (VSVDB) recorded in EDID ROM 231.

FIG. 11A illustrates a basic structure of EDID. The EDID includes a 128 byte base block and a 128 byte extended block (CTA Extension). As illustrated in FIG. 11B, some types of data blocks exist in the extended block, and a data block called VSVDB is defined therein.

FIG. 11C illustrates an example of the structure of the VSVDB including the identification information indicating that the VSVDB corresponds to the uncompressed RAW data. "Vendor-Specific tag code (0x7)" is defined in the 7th bit to the 5th bit of the 1st byte, and a subsequent data length Length (0x06) is defined in the 4th bit to the 0th bit of the 1st byte. Furthermore, "Extended tag code (0x01)" is defined in the 2nd byte. In the 3rd byte (PB1) to the 5th byte (PB3), a 24 bit IEEE Organizationally Unique Identifier (OUI) of a product vendor is arranged.

Then, "Sink Vendor ID (for example, 0x01)" is arranged in the 6th byte, and "Function Code (for example, 0x01)" is arranged in the 7th byte. The information constitutes identification information indicating that the reception device 200 supports uncompressed RAW data.

Figure 12:
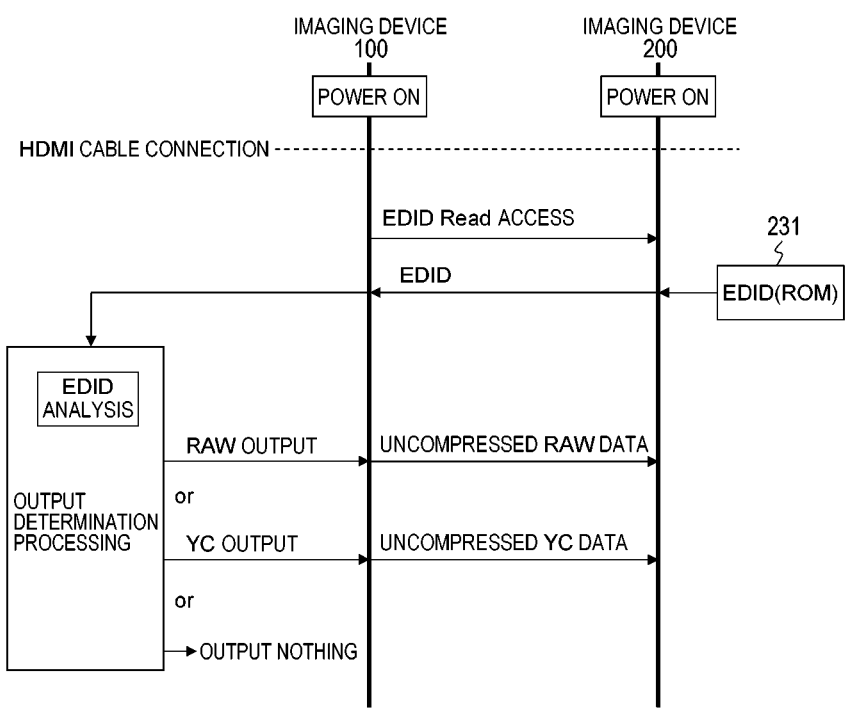
FIG. 12 is a sequence diagram illustrating an example of output processing of the imaging device based on EDID read from an EDID ROM of the reception device at the beginning of connection.

The sequence diagram of FIG. 12 illustrates an example of output processing of the imaging device 100 based on EDID read from the EDID ROM 231 of the reception device 200 at the beginning of connection.

When each of the imaging device 100 and the reception device 200 is connected by the HDMI cable 300 in a state where the power of each of the imaging device 100 and the reception device is turned on, EDID read access is transmitted from the imaging device to the reception device 200. On the other hand, the EDID is read from the EDID ROM 231, and the EDID is transmitted to the imaging device 100.

The imaging device 100 receives the EDID transmitted from the reception device 200, performs output determination processing on the basis of the EDID, and determines whether to output RAW data, output YC data, or output nothing. Then, the imaging device 100 transmits the uncompressed RAW data to the reception device 200 in a case where it is determined to output the RAW data, transmits the uncompressed YC data to the reception device 200 in a case where it is determined to output the YC data, and outputs nothing to the reception device 200 in a case where it is determined not to output nothing.

Figure 13:
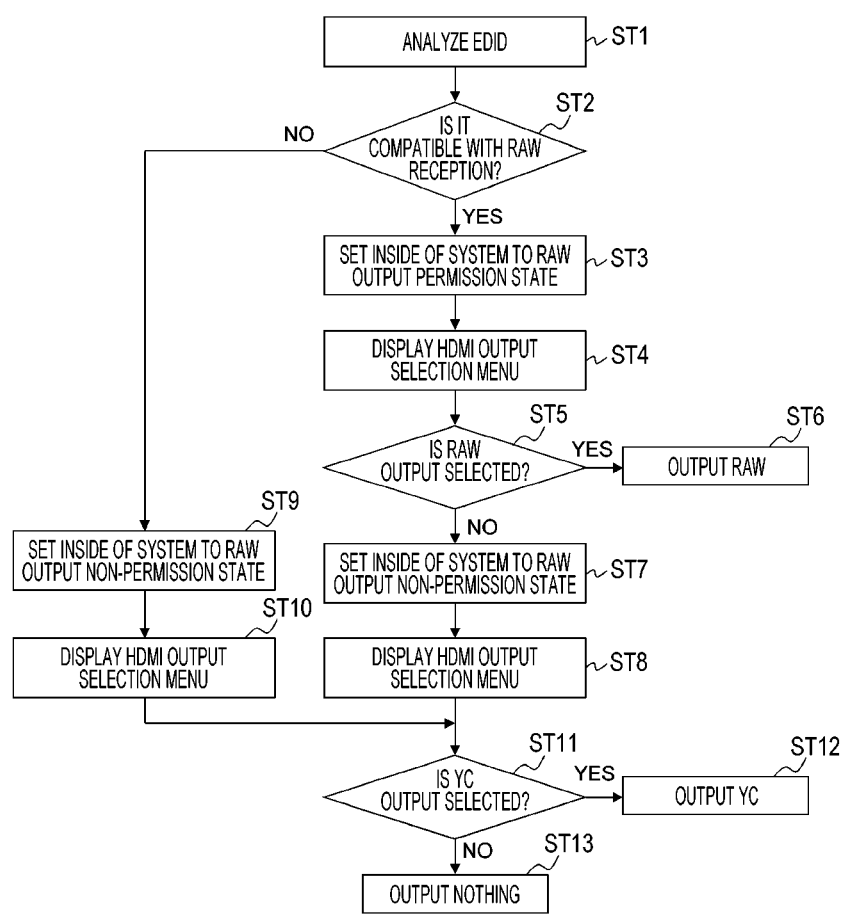
FIG. 13 is a flowchart illustrating an example of output determination processing in a control unit of the imaging device.

The flowchart of FIG. 13 illustrates an example of output determination processing in the control unit 103 of the imaging device 100. First, in step ST1, the control unit 103 analyzes EDID. Next, in step ST2, the control unit 103 determines whether the reception device 200 is compatible with RAW reception, that is, whether the reception device 200 is compatible with uncompressed RAW data. The control unit 103 determines that the reception device 200 is compatible with RAW reception when there is a VSVDB including identification information indicating that the reception device 200 is compatible with uncompressed RAW data in EDID.

Figure 14A:
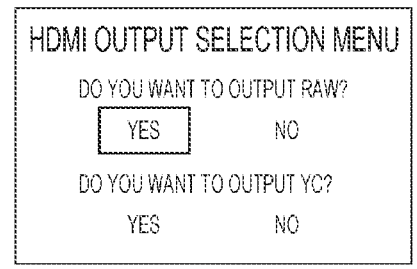
FIGS. 14A, 14B, and 14C are diagrams illustrating an HDMI output selection menu displayed on a display unit of the imaging device.

When determining in step ST2 that it is compatible with RAW reception, the control unit 103 sets the inside of the system to a RAW output permission state in step ST3. Then, in step ST4, the control unit 103 displays an HDMI output selection menu on a display unit as illustrated in FIG. 14A. In the HDMI output selection menu, the user can select whether to perform RAW output. The illustrated example illustrates a state in which "output RAW" is selected. Note that, here, selection of whether to perform YC output is disabled.

Next, in step ST5, the control unit 103 determines whether the RAW output is selected. When determining that the "output RAW" is selected, the control unit 103 determines to perform RAW output in step ST6.

Figure 14B:
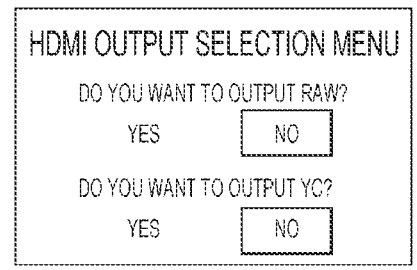

If it is determined in step ST5 that the user has selected not to perform RAW output, the control unit 103 sets the inside of the system to a RAW output non-permission state in step ST7. Next, in step ST8, the control unit 103 displays an HDMI output selection menu on a display unit as illustrated in FIG. 14B. In the HDMI output selection menu, the user can select whether to perform YC output. The illustrated example illustrates a state in which "Not perform YC output" is selected.

Figure 14C:
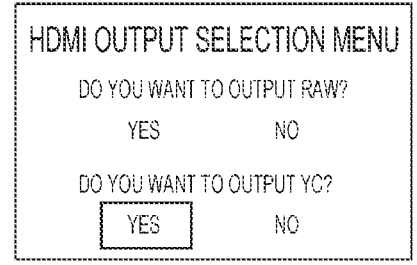

When determining in step ST2 that RAW reception is not supported, the control unit 103 sets the inside of the system to a RAW output non-permission state in step ST9. Next, in step ST10, the control unit 103 displays an HDMI output selection menu on a display unit as illustrated in FIG. 14C. In the HDMI output selection menu, the user can select whether to perform YC output. The illustrated example illustrates a state in which "Perform YC output" is selected. Note that, here, selection of whether to perform RAW output is disabled.

After the processing of step ST8 or after the processing of step ST10, the control unit 103 determines whether "output YC" is selected in step ST11. When determining that the "output YC" is selected, the control unit 103 determines to perform YC output in step ST12. On the other hand, when determining that "Not perform YC output" is selected, the control unit 103 determines to output nothing in step ST13.

Note that, in the above, an example has been described in which the identification information indicating that the reception device 200 supports the uncompressed RAW data, which is included in the VSVDB recorded in the EDID ROM 231, is used. However, it is also conceivable to use identification information indicating that the reception device 200 supports uncompressed RAW data, the identification information being written in a manufacture area of the SCDC register unit 232, that is, a manufacturer specific registers.

FIG. 15 is a diagram illustrating an example of a data structure in a manufacturer specific register. In 3 bytes of the offsets "0xD0" to "0xD2", "Manufacture_OUI" which is a company code issued by applying to IEEE is arranged. A character string "Device ID String" indicating the name of the device is arranged in 8 bytes of the offsets "0xD3" to "0xDA".

A major revision "Hardware_Major_Rev" of hardware is arranged in the 4 bits from the 7th bit to the 4th bit of the offset "0xDB", and a minor revision "Hardware_Minor_Rev" of hardware is arranged in the 4 bits from the 3rd bit to the 0th bit.

A major revision "Software_Major_Rev" of the software is arranged in 1 byte of the offset "0xDC". A minor revision "Software_Minor_Rev" of software is arranged in 1 byte of the offset "0xDD".

"Sink Vendor ID (for example, 0x01)" is arranged in 1 byte of the offset "0xDE", and "Function Code (for example, 0x01)" is arranged in 1 byte of the offset "0xDF". The information constitutes identification information indicating that the reception device 200 supports uncompressed RAW data.

1 byte of the offset "0xE0" is, for example, an information area of status 1. In the illustrated example, signal stop request information is arranged in the 7th bit, "1" indicates that a receiving apparatus requests signal stop, and "0" indicates that the receiving apparatus is in a receivable state. Furthermore, in the illustrated example, RAW reception request information is arranged in the 0th bit, "1" indicates that the receiving apparatus requests RAW data, and "0" indicates that the receiving apparatus requests YC data. Furthermore, 1 byte of the offset "0xE1" is, for example, an information area of status 2. In the illustrated example, REC status information is arranged in the 0th bit, "1" indicates that the data received by the receiving apparatus is being processed, that is, being recorded, and "0" indicates that the data received by the receiving apparatus is not being processed.

Figure 16:
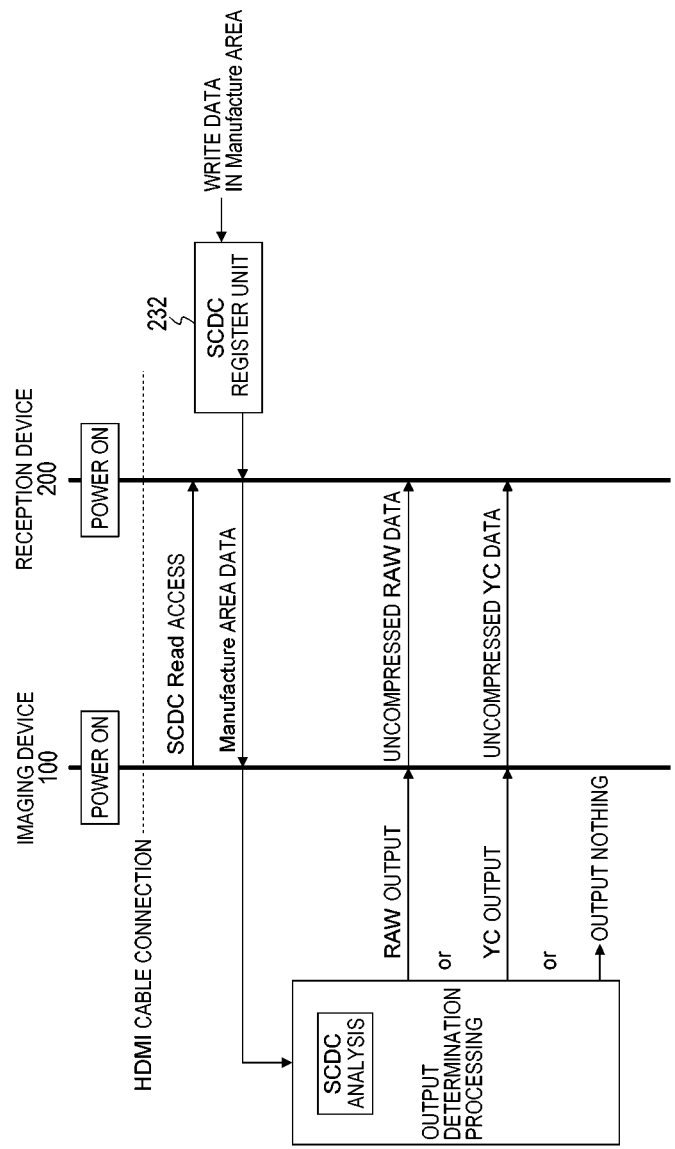
FIG. 16 is a sequence diagram illustrating an example of output processing of the imaging device based on manufacture area data read from an SCDC register unit of a reception device at the beginning of connection.

The sequence diagram of FIG. 16 illustrates an example of output processing of the imaging device 100 on the basis of the manufacture area data read from the SCDC register unit 232 of the reception device 200 at the beginning of connection.

When each of the imaging device 100 and the reception device 200 is connected by the HDMI cable 300 in a state where the power supply of each of the imaging device and the reception device is turned on, an SCDC read access (read access of a manufacture area) is sent from the imaging device 100 to the reception device 200. On the other hand, the manufacture area data of the SCDC register unit 232 is read, and the manufacture area data is sent to the imaging device 100.

The imaging device 100 receives the manufacture area data sent from the reception device 200, performs output determination processing on the basis of the manufacture area data, and determines whether or to output RAW data, output YC data, or output nothing. The output determination processing is similar to the output determination processing of the imaging device 100 in the sequence diagram of FIG. 12 (see FIG. 13), except that the determination that the reception device 200 is compatible with RAW reception is performed by the identification information indicating that the reception device 200 is compatible with uncompressed RAW data being included in the manufacture area data.

The imaging device 100 transmits the uncompressed RAW data to the reception device 200 in a case where it is determined to output the RAW data, transmits the uncompressed YC data to the reception device 200 in a case where it is determined to output the YC data, and outputs nothing to the reception device 200 in a case where it is determined not to output anything.

Figure 17:
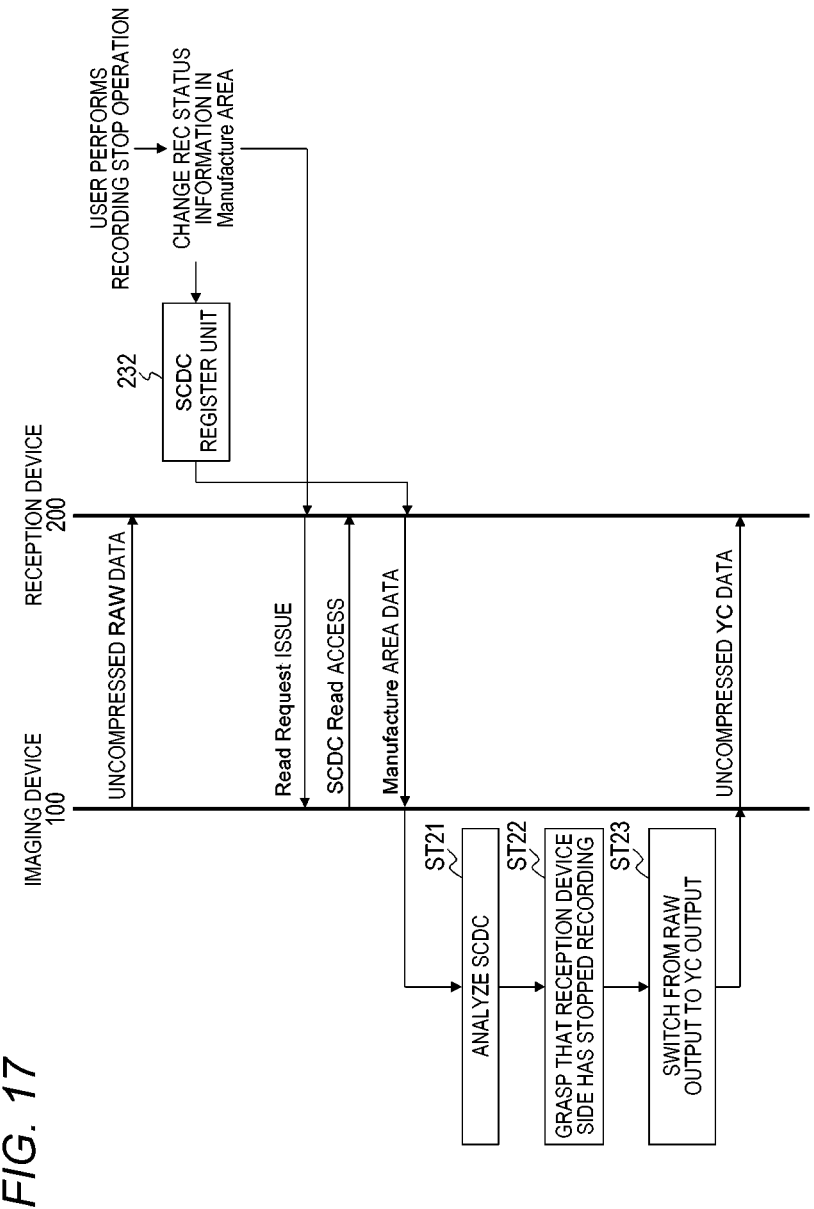
FIG. 17 is a sequence diagram illustrating an example of output processing of the imaging device in a case where a user performs a recording stop operation in the reception device while the imaging device is transmitting the uncompressed RAW data to the reception device.

The sequence diagram of FIG. 17 illustrates an example of output processing of the imaging device 100 in a case where the user performs a recording stop operation in the reception device 200 while the imaging device 100 is transmitting the uncompressed RAW data to the reception device 200.

When the user performs the recording stop operation on the reception device 200 side, the control unit 203 of the reception device 200 changes the REC status information at the 0th bit of the offset "0xE1" of the manufacturing area of the SCDC register unit 232 from "1" to "0". Then, a Read request is issued from the reception device 200 to the imaging device 100.

When the read request is issued, an SCDC read access (read access of a manufacturer area) is sent from the imaging device 100 to the reception device 200. On the other hand, the manufacture area data of the SCDC register unit 232 is read, and the manufacture area data is sent to the imaging device 100.

In step ST21, the control unit 103 of the imaging device 100 analyzes manufacture area data. Next, in step ST22, the control unit 103 grasps that the reception device 200 side has stopped recording because the REC status information of the 0th bit of the offset "0xE1" has been changed to "0". Next, in step ST23, the control unit 103 determines to switch from the RAW output to the YC output. On the basis of the determination, the imaging device 100 transmits uncompressed YC data instead of the uncompressed RAW data.

Note that, in the above description, the imaging device 100 can transmit the uncompressed RAW data to the reception device 200 in a case where the reception device 200 supports the uncompressed RAW data. However, in a case where the reception device 200 supports the uncompressed RAW data and the reception device 200 requests reception of the uncompressed RAW data, the imaging device 100 may be able to transmit the uncompressed RAW data to the reception device 200. In this case, the imaging device 100 can determine whether the reception device 200 requests reception of the uncompressed RAW data on the basis of the 0th bit RAW reception request information of the offset "0xE0" of the manufacture area data.

Furthermore, in the above description, whether the reception device 200 is in a state capable of receiving a signal is not mentioned. However, only in a case where the reception device 200 is in a state capable of receiving a signal, the imaging device 100 may be able to transmit the uncompressed RAW data and the uncompressed YC data to the reception device 200. In this case, the imaging device 100 can determine whether the reception device 200 is in a signal receivable state on the basis of the 7th bit signal stop request information of the offset "0xE0" of the manufacture area data.

"Configuration Example of Imaging Device"

Figure 18:
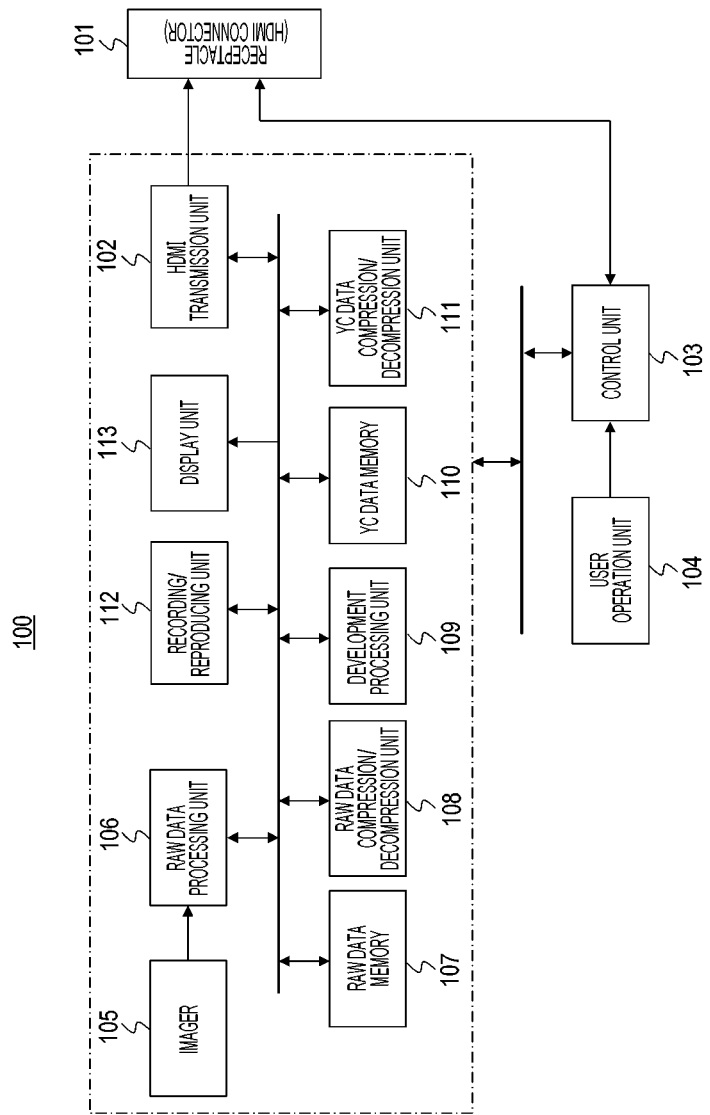
FIG. 18 is a block diagram illustrating a configuration example of the imaging device.

FIG. 18 illustrates a configuration example of the imaging device 100. The imaging device 100 includes a receptacle 101 as an HDMI connector, an HDMI transmission unit 102, a control unit 103, a user operation unit 104, an imager 105, a RAW data processing unit 106, a RAW data memory 107, a RAW data compression/decompression unit 108, a development processing unit 109, a YC data memory 110, a YC data compression/decompression unit 111, a recording/reproducing unit 112, and a display unit 113.

The control unit 103 includes a central processing unit (CPU) and controls the entire imaging device 100. The user operation unit 104 is connected to the control unit 103 and constitutes a user interface for the user to perform various operations.

The imager 105 includes, for example, a C-MOS imaging element or a CCD imaging element, and outputs uncompressed RAW data as captured image data. The uncompressed RAW data is, for example, uncompressed RAW data in a Bayer layout (see FIG. 4).

The RAW data processing unit 106 performs processing such as noise reduction, defect correction, and automatic white balance on the uncompressed RAW data output from the imager 105. Note that the RAW data processing unit 106 may be omitted. The RAW data memory 107 includes, for example, a dynamic random access memory (DRAM), and is a memory that temporarily stores uncompressed RAW data and compressed RAW data. The RAW data compression/decompression unit 108 performs processing of compressing the uncompressed RAW data to obtain compressed RAW data, or processing of decompressing the compressed RAW data to obtain uncompressed RAW data. Note that the RAW data compression/decompression unit 108 may be omitted.

The development processing unit 109 performs processing of developing the uncompressed RAW data to obtain uncompressed YC data. The YC data memory 110 includes, for example, a DRAM, and is a memory that temporarily stores uncompressed YC data and compressed YC data. The YC data compression/decompression unit 111 performs a process of compressing the uncompressed YC data to obtain compressed YC data or a process of decompressing the compressed YC data to obtain uncompressed YC data.

The recording/reproducing unit 112 records and reproduces the compressed RAW data and the compressed YC data in and from a recording medium (not illustrated). The recording medium is, for example, an optical disc, a hard disk, a semiconductor memory, or the like. The display unit 113 includes, for example, a liquid crystal display, an organic EL display, and the like, and displays an image or a UI screen. The HDMI transmission unit 102 transmits the uncompressed RAW data or the uncompressed YC data to the reception device 200 via the receptacle 101 and the HDMI cable 300 by communication conforming to HDMI via the HDMI cable 300.

Next, an operation example of the imaging device 100 illustrated in FIG. 18 will be described. First, an operation example in a case where uncompressed RAW data obtained by imaging by the imager 105 is transmitted to the reception device 200 will be described.

From the imager 105, the uncompressed RAW data of the Bayer layout having a bit length of 16 bits for each pixel is output. The uncompressed RAW data is subjected to processing such as noise reduction, defect correction, and automatic white balance in the RAW data processing unit 106, and then temporarily written in the RAW data memory 107. In this case, data of each pixel of the uncompressed RAW data is sequentially written into the RAW data memory 107 (see FIG. 7A).

The uncompressed RAW data sequentially written in the RAW data memory 107 is sequentially read from the RAW data memory 107 and supplied to the HDMI transmission unit 102. The HDMI transmission unit 102 generates the TMDS transmission data (see FIG. 3) in which the uncompressed RAW data is stored in the active video interval, and transmits the TMDS transmission data to the reception device 200 through the receptacle 101 serving as the HDMI connector.

In this case, in the HDMI transmission unit 102, the uncompressed RAW data is packed in each of the TMDS channels #0 to #2 using the YC 12 bit transfer mode (see FIGS. 7B and 7C). Furthermore, in the HDMI transmission unit 102, the VSIF packet (see FIGS. 9 and 10) is inserted into the vertical blanking interval of the TMDS transmission data. In the payload portion of the VSIF packet, the metadata related to the uncompressed RAW data is stored.

Note that, in a case where the uncompressed RAW data obtained by imaging by the imager 105 is transmitted to the reception device 200, the recording/reproducing unit 112 records the captured image data in a format of compressed RAW data or compressed YC data according to a user operation.

A case where recording is performed in the form of compressed RAW data will be described. In this case, the uncompressed RAW data written in the RAW data memory 107 is read from the RAW data memory 107 and supplied to the RAW data compression/decompression unit 108. The RAW data compression/decompression unit 108 performs compression processing on the uncompressed RAW data to obtain compressed RAW data. Then, the compressed RAW data obtained by the RAW data compression/decompression unit 108 in this manner is supplied to the recording/reproducing unit 112 and recorded.

A case where recording is performed in the form of compressed YC data will be described. In this case, the uncompressed RAW data written in the RAW data memory 107 is read from the RAW data memory 107 and supplied to the development processing unit 109. The development processing unit 109 performs development processing on the uncompressed RAW data to obtain uncompressed YC data, for example, image data of the YCbCr 4:2:2 system.

The uncompressed YC data obtained by the development processing unit 109 in this manner is temporarily written in the YC data memory 110. The uncompressed YC data written in the YC data memory 110 is sequentially read from the YC data memory 110 and supplied to the YC data compression/decompression unit 111. The YC data compression/decompression unit 111 performs compression processing on the uncompressed YC data to obtain compressed YC data. Then, the compressed YC data obtained by the YC data compression/decompression unit 111 in this manner is supplied to the recording/reproducing unit 112 and recorded.

Furthermore, in a case where the uncompressed RAW data obtained by imaging by the imager 105 is transmitted to the reception device 200, the captured image is displayed on the display unit 113. In this case, the uncompressed RAW data written in the RAW data memory 107 is read from the RAW data memory 107 and supplied to the development processing unit 109.

The development processing unit 109 performs development processing on the uncompressed RAW data to obtain uncompressed YC data. The uncompressed YC data obtained by the development processing unit 109 in this manner is temporarily written in the YC data memory 110. Then, the uncompressed YC data written in the YC data memory 110 is supplied to the display unit 113 to display the captured image.

Next, an operation example in a case where uncompressed YC data obtained by developing the uncompressed RAW data from the imager 105 is transmitted to the reception device 200 will be described.

In this case, from the imager 105, the uncompressed RAW data of the Bayer layout having a bit length of 16 bits for each pixel is output. The uncompressed RAW data is subjected to processing such as noise reduction, defect correction, and automatic white balance in the RAW data processing unit 106, further subjected to compression processing in the RAW data compression/decompression unit 108, and then temporarily written in the RAW data memory 107.

The compressed RAW data written in the RAW data memory 107 is read from the RAW data memory 107 and supplied to the RAW data compression/decompression unit 108. The RAW data compression/decompression unit 108 performs decompression processing on the compressed RAW data to obtain uncompressed RAW data. The uncompressed RAW data is supplied to the development processing unit 109.

The development processing unit 109 performs development processing on the uncompressed RAW data to obtain uncompressed YC data, for example, image data of the YCbCr 4:2:2 system. In the uncompressed YC data, pixels of "Y: 12 bits+Cb: 12 bits" and pixels of "Y: 12 bits+Cr: 12 bits" are alternately continuous in each line.

The uncompressed YC data obtained by the development processing unit 109 in this manner is temporarily written in the YC data memory 110. In this case, data of each pixel of the uncompressed YC data is sequentially written into the YC data memory 110 (see FIG. 6A). The uncompressed YC data sequentially written in the YC data memory 110 is sequentially read from the YC data memory 110 and supplied to the HDMI transmission unit 102.

The HDMI transmission unit 102 generates the TMDS transmission data (see FIG. 3) in which the YC data is stored in the active video interval, and transmits the TMDS transmission data to the reception device 200 through the receptacle 101 serving as the HDMI connector. In this case, in the HDMI transmission unit 102, the YC data is packed in each of the TMDS channels #0 to #2 using the YC 12 bit transfer mode (see FIG. 6B).

Note that, in a case where the uncompressed YC data obtained by developing the uncompressed RAW data from the imager 105 is transmitted to the reception device 200, the recording/reproducing unit 112 records the captured image data in a format of compressed RAW data or compressed YC data according to a user operation.

A case where recording is performed in the form of compressed RAW data will be described. In this case, the compressed RAW data written in the RAW data memory 107 is read from the RAW data memory 107, supplied to the recording/reproducing unit 112, and recorded.

Next, a case where recording is performed in the form of compressed YC data will be described. In this case, the compressed RAW data written in the RAW data memory 107 is read from the RAW data memory 107 and supplied to the RAW data compression/decompression unit 108. The RAW data compression/decompression unit 108 performs decompression processing on the compressed RAW data to obtain uncompressed RAW data. The uncompressed RAW data is supplied to the development processing unit 109. The development processing unit 109 performs development processing on the uncompressed RAW data to obtain uncompressed YC data, for example, image data of the YCbCr 4:2:2 system.

The uncompressed YC data obtained by the development processing unit 109 in this manner is temporarily written in the YC data memory 110. The uncompressed YC data written in the YC data memory 110 is read from the YC data memory 110 and supplied to the YC data compression/decompression unit 111. The YC data compression/decompression unit 111 performs compression processing on the uncompressed YC data to obtain compressed YC data. Then, the compressed YC data obtained by the YC data compression/decompression unit 111 in this manner is supplied to the recording/reproducing unit 112 and recorded.

Furthermore, in a case where the uncompressed YC data obtained by developing the uncompressed RAW data from the imager 105 is transmitted to the reception device 200, the captured image is displayed on the display unit 113. In this case, the compressed RAW data written in the RAW data memory 107 is read from the RAW data memory 107 and supplied to the RAW data compression/decompression unit 108. The RAW data compression/decompression unit 108 performs decompression processing on the compressed RAW data to obtain uncompressed RAW data.

The uncompressed RAW data is supplied to the development processing unit 109. The development processing unit 109 performs development processing on the uncompressed RAW data to obtain uncompressed YC data, for example, image data of the YCbCr 4:2:2 system. The uncompressed YC data obtained by the development processing unit 109 in this manner is temporarily written in the YC data memory 110. Then, the uncompressed YC data written in the YC data memory 110 is supplied to the display unit 113 to display the captured image.

Next, an operation example in a case where uncompressed RAW data or uncompressed YC data related to compressed RAW data reproduced by the recording/reproducing unit 112 is transmitted to the reception device 200 will be described.

A case where uncompressed RAW data is transmitted will be described. In this case, the compressed RAW data reproduced by the recording/reproducing unit 112 is supplied to the RAW data compression/decompression unit 108. The RAW data compression/decompression unit 108 performs decompression processing on the compressed RAW data to obtain uncompressed RAW data. The uncompressed RAW data is temporarily written in the RAW data memory 107. In this case, data of each pixel of the uncompressed RAW data is sequentially written into the RAW data memory 107 (see FIG. 7A).

The uncompressed RAW data sequentially written in the RAW data memory 107 is sequentially read from the RAW data memory 107 and supplied to the HDMI transmission unit 102. The HDMI transmission unit 102 generates the TMDS transmission data (see FIG. 3) in which the uncompressed RAW data is stored in the active video interval, and transmits the TMDS transmission data to the reception device 200 through the receptacle 101 serving as the HDMI connector.

In this case, in the HDMI transmission unit 102, the uncompressed RAW data is packed in each of the TMDS channels #0 to #2 using the YC 12 bit transfer mode (see FIGS. 7B and 7C). Furthermore, in the HDMI transmission unit 102, the VSIF packet (see FIGS. 9 and 10) is inserted into the vertical blanking interval of the TMDS transmission data. In the payload portion of the VSIF packet, the metadata related to the uncompressed RAW data is stored.

Next, a case where the uncompressed YC data is transmitted will be described. In this case, the compressed RAW data reproduced by the recording/reproducing unit 112 is supplied to the RAW data compression/decompression unit 108. The RAW data compression/decompression unit 108 performs decompression processing on the compressed RAW data to obtain uncompressed RAW data.

The uncompressed RAW data is supplied to the development processing unit 109. The development processing unit 109 performs development processing on the uncompressed RAW data to obtain uncompressed YC data, for example, image data of the YCbCr 4:2:2 system. In the uncompressed YC data, pixels of "Y: 12 bits+Cb: 12 bits" and pixels of "Y: 12 bits+Cr: 12 bits" are alternately continuous in each line.

The uncompressed YC data obtained by the development processing unit 109 in this manner is temporarily written in the YC data memory 110. In this case, data of each pixel of the uncompressed YC data is sequentially written into the YC data memory 110 (see FIG. 6A). The uncompressed YC data sequentially written in the YC data memory 110 is sequentially read from the YC data memory 110 and supplied to the HDMI transmission unit 102.

The HDMI transmission unit 102 generates the TMDS transmission data (see FIG. 3) in which the YC data is stored in the active video interval, and transmits the TMDS transmission data to the reception device 200 through the receptacle 101 serving as the HDMI connector. In this case, in the HDMI transmission unit 102, the YC data is packed in each of the TMDS channels #0 to #2 using the YC 12 bit transfer mode (see FIG. 6B).

Next, an operation example in a case where uncompressed YC data related to the compressed YC data reproduced by the recording/reproducing unit 112 is transmitted to the reception device 200 will be described.

In this case, the compressed YC data reproduced by the recording/reproducing unit 112 is supplied to the YC data compression/decompression unit 111. The YC data compression/decompression unit 111 performs decompression processing on the compressed YC data to obtain uncompressed YC data, for example, image data of the YCbCr 4:2:2 system. In the uncompressed YC data, pixels of "Y: 12 bits+Cb: 12 bits" and pixels of "Y: 12 bits+Cr: 12 bits" are alternately continuous in each line.

The uncompressed YC data obtained by the YC data compression/decompression unit 111 in this manner is temporarily written to the YC data memory 110. In this case, data of each pixel of the uncompressed YC data is sequentially written into the YC data memory 110 (see FIG. 6A). The uncompressed YC data sequentially written in the YC data memory 110 is sequentially read from the YC data memory 110 and supplied to the HDMI transmission unit 102.

The HDMI transmission unit 102 generates the TMDS transmission data (see FIG. 3) in which the YC data is stored in the active video interval, and transmits the TMDS transmission data to the reception device 200 through the receptacle 101 serving as the HDMI connector. In this case, in the HDMI transmission unit 102, the YC data is packed in each of the TMDS channels #0 to #2 using the YC 12 bit transfer mode (see FIG. 6B).

Next, an operation example in a case where the image related to the compressed RAW data or the compressed YC data reproduced by the recording/reproducing unit 112 is displayed on the display unit 113 will be described.

A case where the compressed RAW data is reproduced will be described. In this case, the compressed RAW data reproduced by the recording/reproducing unit 112 is supplied to the RAW data compression/decompression unit 108. The RAW data compression/decompression unit 108 performs decompression processing on the compressed RAW data to obtain uncompressed RAW data.

The uncompressed RAW data is supplied to the development processing unit 109. The development processing unit 109 performs development processing on the uncompressed RAW data to obtain uncompressed YC data, for example, image data of the YCbCr 4:2:2 system. The uncompressed YC data is temporarily written to the YC data memory 110. Then, the uncompressed YC data written in the YC data memory 110 is supplied to the display unit 113, and the reproduced image is displayed.

Next, a case where the compressed YC data is reproduced will be described. In this case, the compressed YC data reproduced by the recording/reproducing unit 112 is supplied to the YC compression/decompression unit 111. The YC compression/decompression unit 111 performs decompression processing on the compressed YC data to obtain the uncompressed YC data. The uncompressed YC data is temporarily stored in the YC data memory 110. Then, the uncompressed YC data written in the YC data memory 110 is supplied to the display unit 113, and the reproduced image is displayed.

"Configuration Example of Reception Device"

Figure 19:
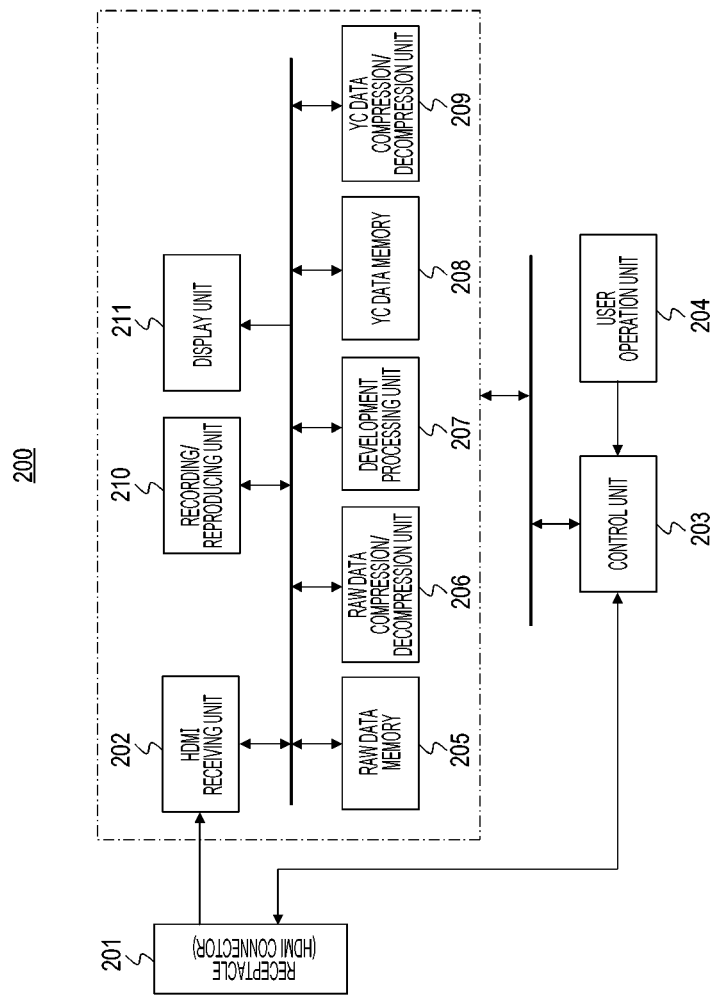
FIG. 19 is a block diagram illustrating a configuration example of the reception device.

FIG. 19 illustrates a configuration example of the reception device 200. The reception device 200 includes the receptacle 201 as an HDMI connector, the HDMI receiving unit 202, the control unit 203, a user operation unit 204, a RAW data memory 205, a RAW data compression/decompression unit 206, a development processing unit 207, a YC data memory 208, a YC data compression/decompression unit 209, a recording/reproducing unit 210, and a display unit 211.

The control unit 203 includes a central processing unit (CPU) and controls the entire reception device 200. The user operation unit 204 is connected to the control unit 203 and constitutes a user interface for the user to perform various operations.

The HDMI receiving unit 202 receives the uncompressed RAW data or the uncompressed YC data from the imaging device 100 via the HDMI cable 300 and the receptacle 201 by communication conforming to HDMI. The RAW data memory 205 includes, for example, a dynamic random access memory (DRAM), and is a memory that temporarily stores uncompressed RAW data and compressed RAW data. The RAW data compression/decompression unit 206 compresses the uncompressed RAW data to obtain compressed RAW data, or decompresses the compressed RAW data to obtain uncompressed RAW data.

The development processing unit 207 performs processing of developing the uncompressed RAW data to obtain uncompressed YC data. The YC data memory 208 includes, for example, a DRAM, and is a memory that temporarily stores uncompressed YC data and compressed YC data. The YC data compression/decompression unit 209 performs a process of compressing the uncompressed YC data to obtain compressed YC data or a process of decompressing the compressed YC data to obtain uncompressed YC data.

The recording/reproducing unit 210 records and reproduces the compressed RAW data and the compressed YC data in and from a recording medium (not illustrated). The recording medium is, for example, an optical disc, a hard disk, a semiconductor memory, or the like. The display unit 211 includes, for example, a liquid crystal display, an organic EL display, or the like, and displays an image or a UI screen.

Next, an operation example of the reception device 200 illustrated in FIG. 19 will be described. First, an operation example in a case where uncompressed RAW data is received and received image data is recorded in a format of compressed RAW data or compressed YC data will be described.

In this case, the HDMI receiving unit 202 receives the TMDS transmission data (see FIG. 3) in which the uncompressed RAW data is stored in the active video interval, and obtains the uncompressed RAW data. A VSIF packet (see FIGS. 9 and 10) is inserted into the vertical blanking interval of the TMDS transmission data, and metadata related to the uncompressed RAW data is stored in the payload portion of the VSIF packet.

The HDMI receiving unit 202 extracts the VSIF packet and transmits the VSIF packet to the control unit 203. When the VSIF packet is transmitted, the control unit 203 recognizes that the uncompressed RAW data is transmitted. Furthermore, the control unit 203 acquires the metadata related to the uncompressed RAW data from the payload portion of the VSIF packet, and controls processing of each unit related to the uncompressed RAW data, for example, development processing, and the like on the basis of the metadata.

A case where recording is performed in the form of compressed RAW data will be described. In this case, the uncompressed RAW data obtained by the HDMI receiving unit 202 is temporarily written in the RAW data memory 205. In this case, data of each pixel of the uncompressed RAW data is sequentially written into the RAW data memory 205 (see FIG. 7A).

The uncompressed RAW data sequentially written to the RAW data memory 205 is sequentially read from the RAW data memory 205 and supplied to the RAW data compression/decompression unit 206. The RAW data compression/decompression unit 206 performs compression processing on the uncompressed RAW data to obtain compressed RAW data. Then, the compressed RAW data obtained by the RAW data compression/decompression unit 206 in this manner is supplied to the recording/reproducing unit 210 and recorded.

Next, a case where recording is performed in the form of compressed YC data will be described. In this case, the uncompressed RAW data obtained by the HDMI receiving unit 202 is temporarily written in the RAW data memory 205. In this case, data of each pixel of the uncompressed RAW data is sequentially written into the RAW data memory 205 (see FIG. 7A).

The uncompressed RAW data sequentially written in the RAW data memory 205 is sequentially read from the RAW data memory 205 and supplied to the development processing unit 207. The development processing unit 207 performs development processing on the uncompressed RAW data to obtain uncompressed YC data, for example, image data of the YCbCr 4:2:2 system.

The uncompressed YC data obtained by the development processing unit 207 in this manner is temporarily written in the YC data memory 208. The uncompressed YC data written in the YC data memory 208 is read from the YC data memory 208 and supplied to the YC data compression/decompression unit 209. The YC data compression/decompression unit 209 performs compression processing on the uncompressed YC data to obtain compressed YC data. Then, the compressed YC data obtained by the YC data compression/decompression unit 209 in this manner is supplied to the recording/reproducing unit 210 and recorded.

Note that, in a case where the uncompressed RAW data is received and the received image data is recorded in a format of compressed RAW data or compressed YC data, an image is displayed on the display unit 113. In this case, the uncompressed RAW data written in the RAW data memory 205 is read from the RAW data memory 205 and supplied to the development processing unit 207.

The development processing unit 207 performs development processing on the uncompressed RAW data to obtain uncompressed YC data. The uncompressed YC data obtained by the development processing unit 207 in this manner is temporarily written in the YC data memory 208. Then, the uncompressed YC data written in the YC data memory 208 is supplied to the display unit 211 to display the captured image.

Next, an operation example in a case where the uncompressed YC data is received and the received image data is recorded in the format of the compressed YC data will be described.

In this case, the HDMI receiving unit 202 receives the TMDS transmission data (see FIG. 3) in which the uncompressed YC data is stored in the active video interval, and obtains the uncompressed YC data, for example, image data of the YCbCr 4:2:2 system. The uncompressed YC data is temporarily written to the YC data memory 208.

The uncompressed YC data written in the YC data memory 208 is read from the YC data memory 208 and supplied to the YC data compression/decompression unit 209. The YC data compression/decompression unit 209 performs compression processing on the uncompressed YC data to obtain compressed YC data. Then, the compressed YC data obtained by the YC data compression/decompression unit 209 in this manner is supplied to the recording/reproducing unit 210 and recorded.

Next, an operation example in a case where the image related to the compressed RAW data or the compressed YC data reproduced by the recording/reproducing unit 210 is displayed on the display unit 113 will be described.

A case where the compressed RAW data is reproduced will be described. In this case, the compressed RAW data reproduced by the recording/reproducing unit 210 is supplied to the RAW data compression/decompression unit 206. The RAW data compression/decompression unit 206 performs decompression processing on the compressed RAW data to obtain uncompressed RAW data.

The uncompressed RAW data is supplied to the development processing unit 207. The development processing unit 207 performs development processing on the uncompressed RAW data to obtain uncompressed YC data, for example, image data of the YCbCr 4:2:2 system. The uncompressed YC data is temporarily written to the YC data memory 208. Then, the uncompressed YC data written in the YC data memory 208 is supplied to the display unit 211, and the reproduced image is displayed.

Next, a case where the compressed YC data is reproduced will be described. In this case, the compressed YC data reproduced by the recording/reproducing unit 210 is supplied to the YC compression/decompression unit 209. The YC compression/decompression unit 209 performs decompression processing on the compressed YC data to obtain the uncompressed YC data. The uncompressed YC data is temporarily stored in the YC data memory 208. Then, the uncompressed YC data written in the YC data memory 208 is supplied to the display unit 211, and the reproduced image is displayed.

As described above, in the imaging system 10 illustrated in FIG. 1, the imaging device 100 can transmit the uncompressed RAW data to the reception device 200 via the HDMI cable 300. Therefore, the uncompressed RAW data can be satisfactorily transmitted between devices. Then, in the reception device 200, although the processing unit is not illustrated in FIG. 19, the image data editing processing and the image quality adjustment processing can be favorably performed.

Furthermore, in the imaging system 10 illustrated in FIG. 1, the imaging device 100 transmits metadata related to the uncompressed RAW data to the reception device 200 together with the uncompressed RAW data. Therefore, the reception device 200 can appropriately and easily acquire the metadata related to the uncompressed RAW data in association with the uncompressed RAW data, and can satisfactorily perform various processing on the uncompressed RAW data on the basis of the metadata.

Furthermore, in the imaging system 10 illustrated in FIG. 1, the imaging device 100 transmits uncompressed RAW data of a Bayer layout having a bit length of 16 bits for each pixel to the reception device 200 via the HDMI cable 300 using a YC 12 bit transfer mode. Therefore, the uncompressed RAW data of the Bayer layout having a bit length of 16 bits for each pixel can be satisfactorily transmitted by effectively using the conventional HDMI transmission/reception system in the YC 12 bit transfer mode.

2. Modification Example

Note that, in the above-described embodiment, an example has been described in which the uncompressed RAW data is the uncompressed RAW data in the Bayer layout; however, in the present technology, the uncompressed RAW data is not limited to the uncompressed RAW data in the Bayer layout. Furthermore, in the above-described embodiment, an example has been described in which the bit length of each pixel of the uncompressed RAW data is 16 bits; however, in the present technology, the bit length of each pixel is not limited to 16 bits.

Furthermore, in the above-described embodiment, an example in which the metadata related to the uncompressed RAW data is stored in the payload portion of the VSIF packet inserted into the vertical blanking interval of the TMDS transmission data and transmitted has been described. However, in the present technology, the method for transmitting the metadata related to the uncompressed RAW data together with the uncompressed RAW data is not limited thereto. For example, other data packets inserted into the vertical blanking interval of the TMDS transmission data may be used for transmission, or may be stored in an area where uncompressed RAW data of the active video interval is not stored (dummy data area in FIG. 8) and transmitted.

Furthermore, in the above-described embodiment, an example has been described in which identification information indicating that uncompressed RAW data is transmitted is inserted into the blanking interval of the TMDS transmission data and transmitted. Specifically, the example in which the VSIF packet in which the metadata related to the uncompressed RAW data is stored in the payload portion has the function of the identification information indicating that the VSIF packet is the transmission of the uncompressed RAW data has been described. However, in the present technology, the identification information indicating that the uncompressed RAW data is transmitted may be transmitted by another method. For example, it is also possible to notify the reception device 200 from the imaging device 100 by communication using the CEC line.

Furthermore, the preferred embodiments of the present disclosure have been described in detail with reference to the accompanying drawings, but the technical scope of the present disclosure is not limited to such examples. It is obvious that a person having ordinary knowledge in the technical field of the present disclosure can conceive various change examples or modification examples within the scope of the technical idea described in the claims, and it is naturally understood that these also belong to the technical scope of the present disclosure.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that, the present technology can also adopt the following configurations.

(1) A transmission device including:
a transmission unit configured to transmit uncompressed RAW data to an external device via an HDMI transmission path.

(2) The transmission device according to above (1), in which
the uncompressed RAW data is uncompressed RAW data in a Bayer layout.

(3) The transmission device according to above (2), in which
a bit length of each pixel of the uncompressed RAW data is 16 bits, and
the transmission unit transmits the uncompressed RAW data using a YC 12 bit transfer mode.

(4) The transmission device according to any one of above (1) to (3), in which
the transmission unit transmits metadata related to the uncompressed RAW data together with the uncompressed RAW data.

(5) The transmission device according to above (4), in which
the transmission unit adds the metadata to each frame of the uncompressed RAW data and transmits the metadata.

(6) The transmission device according to above (5), in which
the transmission unit stores the uncompressed RAW data in an active video interval of transition minimized differential signaling (TMDS) transmission data including the active video interval and a vertical blanking interval, and stores and transmits the metadata in a payload portion of a data packet inserted into the vertical blanking interval.

(7) The transmission device according to above (6), in which
the metadata includes high-update frequency metadata of a first update frequency and low-update frequency metadata of a second update frequency lower than the first update frequency, and
a payload portion of the data packet includes a first area in which the high-update frequency metadata is stored and a second area in which the low-update frequency metadata is stored.

(8) The transmission device according to above (7), in which,
in the second area, a page number area in which information of a page number is stored is included, and metadata corresponding to the page number is stored.

(9) The transmission device according to above (8), in which,
in the second area, a total number of pages area for storing information of a total number of pages is further included.

(10) The transmission device according to above (8) or (9), in which
a transmission frequency of metadata corresponding to each page stored and transmitted in the second area is changed according to a priority of each piece of metadata.

(11) The transmission device according to any one of (6) to (10), in which the data packet is a Vendor Specific InfoFrame (VSIF) packet.

(12) The transmission device according to above (5), in which
the transmission unit stores the uncompressed RAW data in an active video interval of transition minimized differential signaling (TMDS) transmission data including the active video interval, and stores and transmits the metadata in an area of the active video interval where the uncompressed RAW data is not stored.

(13) The transmission device according to any one of above (1) to (12), in which
the transmission unit transmits identification information indicating transmission of the uncompressed RAW data together with the uncompressed RAW data.

(14) The transmission device according to above (13), in which
the transmission unit stores the uncompressed RAW data in an active video interval of transition minimized differential signaling (TMDS) transmission data including the active video interval and a vertical blanking interval, and inserts and transmits the identification information into the vertical blanking interval.

(15) The transmission device according to above (14), in which
the transmission unit inserts a predetermined data packet into the vertical blanking interval as the identification information.

(16) The transmission device according to above (15), in which
metadata related to the uncompressed RAW data is stored in a payload portion of the predetermined data packet.

(17) The transmission device according to any one of above (1) to (16), further including:
an imager configured to output the uncompressed RAW data.

(18) The transmission device according to any one of above (1) to (17), in which
the transmission unit further has a function of transmitting YC data obtained by developing the uncompressed RAW data to the external device via the HDMI transmission path.

(19) A transmission method including:
a procedure of transmitting uncompressed RAW data to an external device via an HDMI transmission path.

(20) A reception device including:
a reception unit configured to receive uncompressed RAW data from an external device via an HDMI transmission path; and
a processing unit configured to process the uncompressed RAW data received by the reception unit.

REFERENCE SIGNS LIST

10 Imaging system
100 Imaging device
101 Receptacle (HDMI connector)
102 HDMI transmission unit
103 Control unit
104 User operation unit
105 Imager
106 RAW data processing unit
107 RAW data memory
108 RAW data compression/decompression unit
109 Development processing unit
110 YC data memory
111 YC data compression/decompression unit
112 Recording/reproducing unit
113 Display unit
121 HDMI transmitter
122 IIC master block
200 Reception device
201 Receptacle (HDMI connector)
202 HDMI receiving unit
203 Control unit
204 User operation unit
205 RAW data memory
206 RAW data compression/decompression unit
207 Development processing unit
208 YC data memory
209 YC data compression/decompression unit
210 Recording/reproducing unit
211 Display unit
221 HDMI receiver
222 Memory unit
231 EDID ROM
232 SCDC register unit
300 HDMI cable
301, 302 Plug (HDMI connector)

The invention claimed is:

1. A transmission device, comprising:
a transmission unit configured to transmit, via an HDMI transmission path, uncompressed RAW data to an external device using a YC 12 bit transfer mode, wherein
the uncompressed RAW data is uncompressed RAW data in a Bayer layout, and
a bit length of each pixel of the uncompressed RAW data is 16 bits.

2. The transmission device according to claim 1, wherein the transmission unit is further configured to transmit metadata related to the uncompressed RAW data with the uncompressed RAW data.

3. The transmission device according to claim 2, wherein the transmission unit is further configured to:
add the metadata to each frame of the uncompressed RAW data; and
transmit the metadata.

4. The transmission device according to claim 3, wherein the transmission unit is further configured to:
store the uncompressed RAW data in an active video interval of transition minimized differential signaling (TMDS) transmission data, wherein the TMDS transmission data includes the active video interval and a vertical blanking interval; and
store and transmit the metadata in a payload portion of a data packet inserted into the vertical blanking interval.

5. The transmission device according to claim 4, wherein
the metadata includes high-update frequency metadata of a first update frequency and low-update frequency metadata of a second update frequency lower than the first update frequency, and
the payload portion of the data packet includes a first area in which the high-update frequency metadata is stored and a second area in which the low-update frequency metadata is stored.

6. The transmission device according to claim 5, wherein the second area includes a page number area in which information of a page number is stored and metadata corresponding to the page number is stored.

7. The transmission device according to claim 6, wherein the second area further includes a total number of pages area to store information of a total number of pages.

8. The transmission device according to claim 6, wherein a transmission frequency of metadata corresponding to the page number is based on a priority of piece of metadata associated with the page number.

9. The transmission device according to claim 4, wherein the data packet is a Vendor Specific InfoFrame (VSIF) packet.

10. The transmission device according to claim 3, wherein the transmission unit is further configured to:
store the uncompressed RAW data in an active video interval of transition minimized differential signaling (TMDS) transmission data, wherein the TMDS transmission data includes the active video interval; and
store and transmit the metadata in a first area of the active video interval, wherein the first area is different from a second area of the active video interval where the uncompressed RAW data is stored.

11. The transmission device according to claim 1, wherein the transmission unit is further configured to transmit identification information that indicates the transmission of the uncompressed RAW data.

12. The transmission device according to claim 11, wherein the transmission unit is further configured to:
store the uncompressed RAW data in an active video interval of transition minimized differential signaling (TMDS) transmission data, wherein the TMDS transmission data includes the active video interval and a vertical blanking interval; and
insert and transmit the identification information into the vertical blanking interval.

13. The transmission device according to claim 12, wherein the transmission unit is further configured to insert a specific data packet into the vertical blanking interval as the identification information.

14. The transmission device according to claim 13, wherein the transmission unit is further configured to store metadata related to the uncompressed RAW data in a payload portion of the specific data packet.

15. The transmission device according to claim 1, further comprising an imager configured to output the uncompressed RAW data.

16. The transmission device according to claim 1, wherein the transmission unit is further configured to:
develop the uncompressed RAW data to YC data; and
transmit the YC data to the external device via the HDMI transmission path.

17. A transmission method, comprising:
a procedure of transmitting, via an HDMI transmission path, uncompressed RAW data to an external device using a YC 12 bit transfer mode, wherein
the uncompressed RAW data is uncompressed RAW data in a Bayer layout, and
a bit length of each pixel of the uncompressed RAW data is 16 bits.

* * * * *